(12) United States Patent
Sinha et al.

(10) Patent No.: US 11,474,073 B2
(45) Date of Patent: Oct. 18, 2022

(54) NONINVASIVE ACOUSTICAL PROPERTY MEASUREMENT OF FLUIDS

(71) Applicant: Triad National Security, LLC, Los Alamos, NM (US)

(72) Inventors: Dipen N. Sinha, Los Alamos, NM (US); Cristian Pantea, Los Alamos, NM (US); Blake T. Sturtevant, Lewiston, ME (US); Anirban Chaudhuri, Cary, NC (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 577 days.

(21) Appl. No.: 16/318,862

(22) PCT Filed: Jul. 20, 2017

(86) PCT No.: PCT/US2017/043179
§ 371 (c)(1),
(2) Date: Jan. 18, 2019

(87) PCT Pub. No.: WO2018/017902
PCT Pub. Date: Jan. 25, 2018

(65) Prior Publication Data
US 2019/0242851 A1  Aug. 8, 2019

Related U.S. Application Data

(60) Provisional application No. 62/364,841, filed on Jul. 20, 2016.

(51) Int. Cl.
*G01N 29/024* (2006.01)
*G01H 11/06* (2006.01)
*G01N 29/22* (2006.01)

(52) U.S. Cl.
CPC ........... *G01N 29/024* (2013.01); *G01H 11/06* (2013.01); *G01N 29/223* (2013.01); *G01N 2291/043* (2013.01)

(58) Field of Classification Search
CPC ............... G01N 29/024; G01N 29/223; G01N 2291/043; G01N 29/36; G01H 11/06; G01F 1/66; G01F 1/667
(Continued)

(56) References Cited

U.S. PATENT DOCUMENTS 4,726,235 A * 2/1988 Leffert ...................... G01F 1/66
73/861.04
6,644,119 B1 * 11/2003 Sinha .................... G01N 29/036
702/103
(Continued)

FOREIGN PATENT DOCUMENTS

FR          2569270 A1 *  2/1986  ............. G01P 5/245
WO    WO 2015/150801 A1    10/2015

OTHER PUBLICATIONS

International Searching Authority, International Search Report and Written Opinion for International Application No. PCT/US2017/043179, dated Jan. 17, 2018, 9 pages, United States Patent and Trademark Office, U.S.A.
(Continued)

*Primary Examiner* — Alexander A Mercado
*Assistant Examiner* — Monica S Young
(74) *Attorney, Agent, or Firm* — Alston & Bird LLP

(57) ABSTRACT

Methods for noninvasive determination of acoustical properties of flowing in pipes having a large ratio (>10) of pipe diameter to wall thickness, and in highly attenuating fluids are described. When vibrations are excited on the outer surface of the wall of a pipe, the resulting vibrations propagate directly through the wall in a normal direction and
(Continued)

through the pipe wall as guided waves, appearing on the opposite side of the pipe. This dual path propagation through pipes, where guided waves take the circumferential path in the wall of the pipe and may interfere with the time of-flight measurement obtained from the direct path through the fluid, is at least in part resolved by subtracting the signal from the guided wave from the combined signal, thereby permitting improved observation of the direct path propagation through the fluid.

5 Claims, 15 Drawing Sheets

(58) Field of Classification Search
USPC .......................................................... 73/597
See application file for complete search history.

(56) References Cited

U.S. PATENT DOCUMENTS

| | | |
|---|---|---|
| 2004/0100282 A1 | 5/2004 | Christensen et al. |
| 2004/0149013 A1 | 8/2004 | Baumoel et al. |
| 2008/0098818 A1* | 5/2008 | Fernald ................. G01F 1/7082 73/622 |
| 2009/0078049 A1* | 3/2009 | Sinha ..................... G01N 29/46 73/623 |
| 2009/0078050 A1* | 3/2009 | Sinha ..................... G01N 29/46 73/632 |
| 2009/0084178 A1* | 4/2009 | Sinha ................... G01N 11/167 73/32 A |
| 2009/0241672 A1* | 10/2009 | Gysling ............ G01N 29/4427 73/597 |
| 2010/0145636 A1* | 6/2010 | Nyfors .................... G01F 1/712 702/49 |
| 2012/0055239 A1* | 3/2012 | Sinha ........................ G01F 1/74 73/61.79 |
| 2012/0055253 A1* | 3/2012 | Sinha ................... G01N 29/348 73/622 |
| 2014/0198822 A1 | 7/2014 | Sui et al. |

OTHER PUBLICATIONS

Wang, Y.M, et al., "Guided Waves Mode Discrimination in Pipes NDT Based on the Matching Pursuit Method", Journal of Analytical Sciences, Methods and Instrumentation, Sep. 2012, pp. 149-155, retrieved from URL=<http://file.scirp.org/pdf/JASMI20120300005_94929505.pdf>.

* cited by examiner

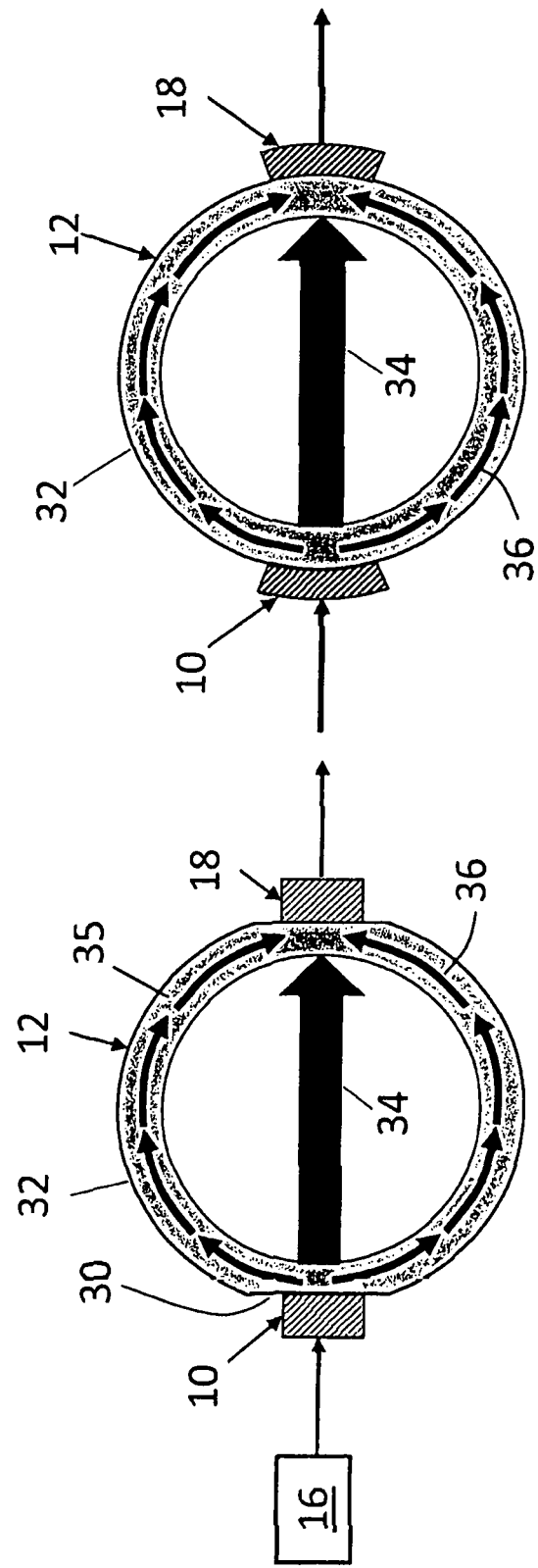

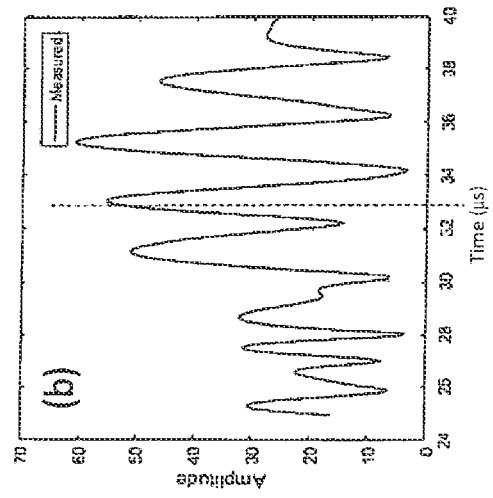
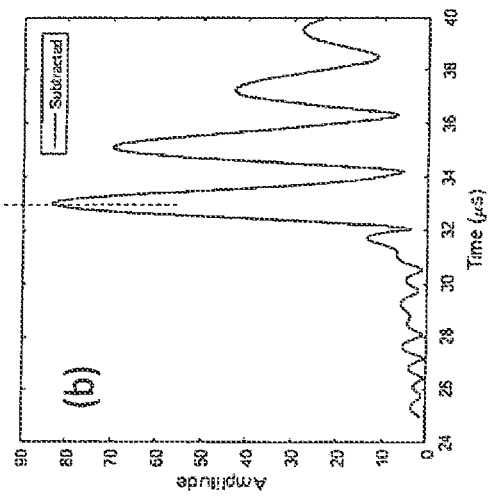
FIG. 7A
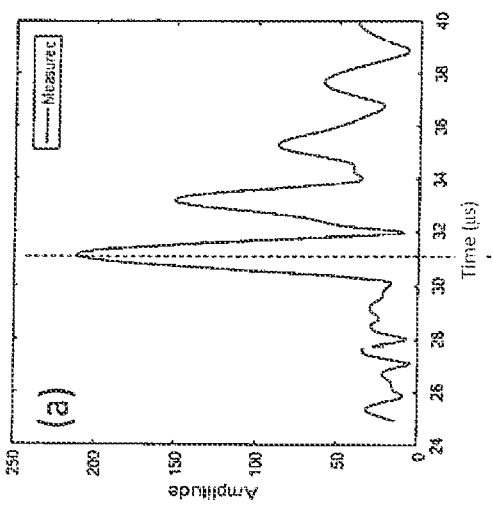
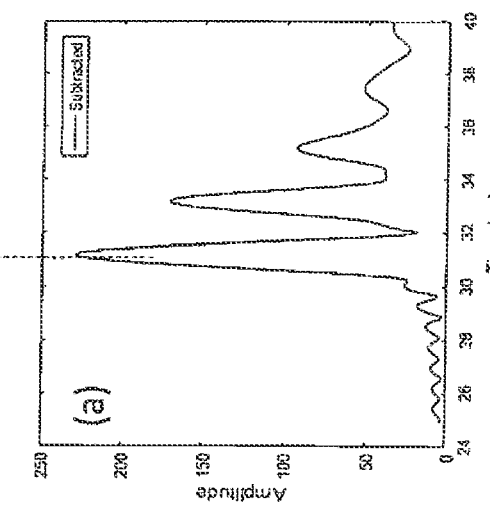
FIG. 7B

1

NONINVASIVE ACOUSTICAL PROPERTY MEASUREMENT OF FLUIDS

CROSS-REFERENCE TO RELATED APPLICATIONS

The present application is a National Stage Application, filed under 35 U.S.C. 371, of International Application No. PCT/US2017/043179, filed Jul. 20, 2017, which claims priority to and the benefit of United States Provisional Patent Application No. 62/364,841 for "Noninvasive Acoustical Property Measurement of Fluids" which was filed on Jul. 20, 2016, the entire contents of both of which is as are hereby specifically incorporated by reference herein for all that they disclose and teach.

STATEMENT REGARDING FEDERAL RIGHTS

This invention was made with government support under Contract No. DE-AC52-06NA25396 awarded by the U.S. Department of Energy. The government has certain rights in the invention.

BACKGROUND

Noninvasive measurements of fluid properties include clamp-on acoustic measurement capability where measurement sensors (transducers) may be attached to the outside of vessels, conduits, and other fluid-filled structures. Penetration of the exterior of the fluid container and provision of a seal for the sensor to obtain access to the fluid, which may adversely affect the structural integrity of the container, is not required. Further, both the fluid and the sensors are protected from contamination by the other.

Various acoustical properties of fluids in metal pipes may be determined using noninvasive measurements. Typically, a piezoelectric transducer is attached to the outside of a pipe as a sound source, and another transducer is attached to the opposite side of the pipe as a receiver. Sound transmission through the pipe is determinative of which acoustical properties of the fluid can be extracted. Measurements may be made in a noncontact or stand-off manner.

SUMMARY

In accordance with the purposes of embodiments of the present invention, as embodied and broadly described herein, the method for noninvasively measuring acoustical properties of a fluid hereof includes: applying a frequency shaped pulse signal to a first ultrasonic transducer in vibrational communication with an outside surface of a pipe having a wall and through which the fluid is flowing, whereby vibrations are generated in the fluid and in the pipe wall; detecting the generated vibrations on a second ultrasonic transducer disposed on the outside surface of the pipe diametrically opposite to the first ultrasonic transducer with fluid flowing through the pipe, wherein a first time-dependent electrical signal is obtained; applying the frequency shaped pulse signal to the first ultrasonic transducer when the pipe is empty, such that vibrations are generated solely in the pipe wall; detecting the generated vibrations on the second ultrasonic transducer, wherein a second time-dependent electrical signal is obtained; subtracting the second electrical signal from the first electrical signal whereby a time-dependent difference electrical signal is produced; determining the time-of-flight of the generated vibrations between the first transducer and the second transducer using the difference electrical signal; and determining the time of flight of the generated vibrations in the pipe wall from the difference electrical signal, from which acoustical properties of the fluid are determined.

In another aspect of embodiments of the present invention as embodied and broadly described herein, the method for noninvasively measuring acoustical properties of a fluid hereof includes: applying a shaped pulse signal to a first ultrasonic transducer in vibrational communication with an outside surface of a pipe having a wall and through which the fluid is flowing, whereby vibrations are generated in the fluid and in the pipe wall; detecting the generated vibrations on a second ultrasonic transducer disposed on the outside surface of the pipe diametrically opposite to the first ultrasonic transducer with fluid flowing through the pipe, wherein a first time-dependent electrical signal is obtained; introducing a chosen gas into the fluid to a gas volume fraction such that no vibrations pass through the fluid; applying the shaped pulse signal to the first ultrasonic transducer, whereby vibrations are generated solely in the pipe wall; detecting the generated vibrations on the second ultrasonic transducer with no vibrations passing through the fluid, wherein a second time-dependent electrical signal is obtained; subtracting the second electrical signal from the first electrical signal whereby a difference electrical signal is generated; determining the time-of-flight of the vibrations between the first transducer and the second transducer using the difference electrical signal; and from which acoustical properties of the fluid are determined.

In yet another aspect of embodiments of the present invention as embodied and broadly described herein, the method for noninvasively measuring acoustical properties of a fluid hereof includes: applying a Gaussian modulated sine pulse signal to a first ultrasonic transducer in vibrational communication with an outside surface of a pipe having a wall and through which said fluid is flowing, whereby vibrations are generated in said fluid and in the pipe wall; detecting the generated vibrations on a second ultrasonic transducer disposed on the outside surface of the pipe diametrically opposite to the first ultrasonic transducer with fluid flowing through the pipe, wherein an electrical signal is obtained; digitizing the electrical signal; determining the time-of-flight of the vibrations between the first transducer and the second transducer using the electrical signal; and determining the time-of-flight of the generated vibrations through the pipe wall from the electrical signal, from which acoustical properties of the fluid are determined.

In another aspect of embodiments of the present invention as embodied and broadly described herein, the method for noninvasively measuring acoustical properties of a fluid hereof includes: applying a pulse having a chosen frequency to a first ultrasonic transducer in vibrational communication with an outside surface of a pipe having a wall and through which said fluid is flowing, whereby vibrations having a first peak intensity are generated in said fluid and vibrations having a second peak intensity are generated in the pipe wall; detecting the generated vibrations on a second ultrasonic transducer disposed on the outside surface of the pipe diametrically opposite to the first ultrasonic transducer after a time period such that the ratio of the first peak vibration intensity to the second peak vibration intensity has reached a chosen value, wherein an electrical signal is obtained; determining the time-of-flight of the vibrations from the first transducer to the second transducer using the electrical signal; and determining the time-of-flight of the generated vibrations through the pipe wall from the electrical signal, from which acoustical properties of the fluid are determined.

Benefits and advantages of embodiments of the present invention include, but are not limited to, a method for noninvasively measuring acoustical properties of a fluid in a pipe, where dual path propagation through pipes in which guided waves take the circumferential path in the wall of the pipe and may interfere with the time-of-flight measurement obtained from the direct path through the fluid, is at least in part resolved by subtracting the signal from the guided wave from the combined signal, thereby permitting improved observation of the single path propagation through the fluid.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a graph of the transmitted ($T_r$) and received ($R_c$) linear frequency chirps as a function of time, showing the overlapping portions as a function of time, FIG. 2B is a graph of the multiplication of the $T_r$ and $R_c$ chirp signals as a function of time, and FIG. 2C illustrates the multiplied signal being filtered to remove the sum frequency, the difference frequency, $f_d$, being constant in time.

FIG. 3A is a schematic representation of sound waves being introduced into a pipe by a transmitting transducer attached to flat portion of the outer surface of the pipe and powered by a function generator, illustrating that the sound waves do not only travel through the liquid inside the pipe, but also along the circumference of the pipe wall (guided wave), while FIG. 3B is a schematic representation of the use of a curved transmitting transducer adapted to efficiently couple acoustic energy into a rounded portion of the outer surface of the pipe, thereby generating less intense guided waves than the flat transducers.

FIGS. 6A and 66 are the deconvolved impulse response of the transducer-pipe-wall-fluid-pipe-wall-transducer system for an empty pipe and a water-filled pipe, respectively, which correspond to the chirp data shown FIGS. 5A and 5B, respectively, with FIG. 6A being a graph of the sound propagation as guided waves as a function of time, the dashed line being an envelope of the data since there are many modes present that arrive at different times, FIG. 66 being a graph of the sound propagation through the liquid superimposed on the guided wave signal as a function of time, the first large peak in FIG. 6B being the first-arrival information, and FIG. 6C showing the benefit of the subtraction technique, where the noise floor has practically disappeared and the signal-to-noise ratio has increased to about 70.

FIGS. 7A(a) and 7B(a) show the POFM-processed data for a process water-filled oil field pipe for a strong signal, while FIGS. 7A(b) and 7B(b), by contrast, show data from a situation where the fluid attenuation is high due to the fluid being highly attenuating crude oil and gas, where FIG. 7B(b) is a graph of the processed received signal, but with the reference signal obtained using an empty pipe having been subtracted from the received time domain data before POFM processing is performed.

FIG. 14 illustrates the use of the subtraction method for enabling the measurement of small variations in composition over time in a flowing crude oil-water mixture, FIG. 14(a) showing the dynamics of the flow and its composition variation for high water-cut situation (water-cut ~80%), while FIG. 14(b) shows the dynamics for a lower water-cut (~20%).

DETAILED DESCRIPTION

Figure 1:
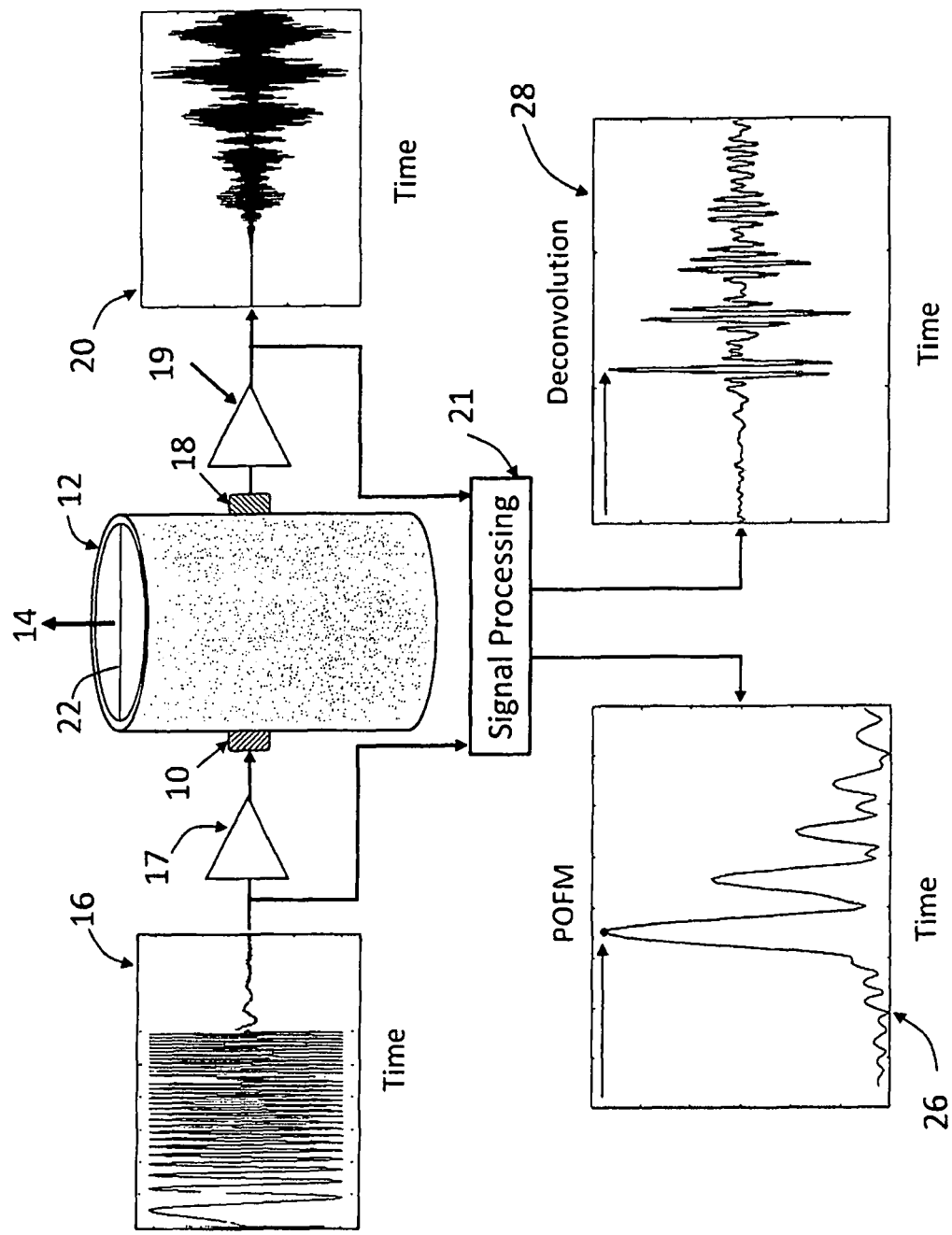
FIG. 1 is a schematic representation of an embodiment of an apparatus suitable for practicing the methods of the present invention.

Briefly, embodiments of the present invention include noninvasive acoustical property measurement of fluids. As mentioned above, such measurements are commonly performed. However, these techniques work well where the ratio of pipe diameter to wall thickness is large (for example, in thin walled containers, where the diameter to thickness ratio exceeds 10) or in situations where the fluid is not highly attenuating. When ultrasonic vibrations are excited on the outer surface of the wall of a fluid-filled pipe, the resulting vibrations propagate directly through the wall and through the fluid in a normal direction, and also through the pipe wall as guided waves, appearing on the opposite side of the pipe. Depending on the size of the pipe, the wall thickness, and the fluid inside of the pipe, these two waves can arrive at different times and may be separated. However, in the oil/gas industry, where a majority of the pipes used for oil extraction from wells and its transport are 2-in. diameter steel pipes, the time of arrival of the signals through these two paths is almost identical or significantly overlapping. If the fluid inside is not significantly acoustically attenuating (e.g., water) the direct path signal is much stronger than the guided-wave signal that propagates around the circumference of the pipe, and accurate sound speed measurements can be made. The exact nature of the waves propagating around the pipe is complicated. There are many modes that propagate, each having its own characteristics and frequency dependence. Most of the waves are confined between the two sides of the wall and are guided by the wall surfaces with some modes having microscopic surface undulations.

By contrast, if the pipe is filled with various types of crude oil or crude oil/water mixtures, the acoustic attenuation increases and the signals travelling through the two paths become close to each other in intensity, and the signal through the direct path may become obscured in the background of the guided wave signal along the pipe circumference.

In oil well production, fluids are commonly multiphase fluids where, in addition to liquids, gas may also be present. The presence of gas substantially lowers the direct path signal through the fluid, making it difficult to separate the two signals and obtain reliable acoustic property measurements. This problem is particularly acute in the situation of high water-cut fluids where the composition of the fluid is greater than 80% water. This is prevalent in a large number of oil wells around the world, with many wells having water-cut as high as >95%. In these situations, the guided wave signal, so strongly interferes with the direct path signal that it becomes impossible to separate the acoustic transmission through the fluid for fluid property determinations. Since water has the highest sound speed in an oil-water fluid mixture, the arrival time through water becomes coincident with that of the guided wave in steel pipes used in the industry, and the signal intensities also become comparable in the presence of any normal quantity of gas found in many oil-wells.

As stated, in the oil/gas industry this is a generic problem; however, it occurs in other situations as well where highly attenuating fluids flow through a conduit. Common approaches for reducing this interference include complicated design of the exciting transducer, special mounting of transducers on the pipe, and various types of damping mechanisms added to the outer surface of the pipe that attempt to reduce the guided wave signal. These approaches at best only incompletely reduce the interference and add substantially to the cost of implementation and maintenance.

Embodiments of the present invention include procedures that are relatively simple to implement without requiring any hardware modification, thus reducing cost. Dual path propagation through pipes, where guided waves take the circumferential path in the wall of the pipe and may interfere with the time-of-flight measurement obtained from the direct path through the fluid, is at least in part resolved by subtracting the signal from the guided wave from the combined signal, thereby permitting improved observation of the single path propagation through the fluid. As will be explained in detail below, after subtracting the guided wave signal from the combined received signal, any of the following data processing methods may be performed: Pulse Overlap Frequency Mixing (POFM); Signal deconvolution; Shaped pulse (more effective than cross-correlation); Selective frequency excitation; and Guided wave decay.

Present Noninvasive Measurement Techniques:

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. The following provides a description of an embodiment of the current noninvasive measurement technology. This technology may be used to practice the methods of embodiments of the present invention. As mentioned above and illustrated in FIG. 1, ultrasonic transmit transducer, 10, attached on the outside of container, 12, such as a pipe, through which fluid, 14, may be flowing, and driven by a frequency chirp from arbitrary wave function generator, 16, (between 500 kHz to 10 MHz), and of short duration (typically ~50 to ~80 µs, depending on the pipe geometry (in this case, 1.75 in. ID), and on the fluid inside the pipe (fluid path length in a 2-in. diameter pipe filled with water), which may be amplified using power amplifier, 17, generates ultrasonic vibrations which are detected on the opposite side of pipe 12 by a second transducer, 18, which may be amplified using amplifier, 19, and shown as the signal on display, 20. The received signal may be amplified depending on the fluid that is being interrogated or monitored. The frequency chirp duration is adjusted for any given pipe configuration such that the transmitted and the received signals overlap in time by approximately 50%. The duration also needs to be shorter than the time for the first echo to be received by the receiver transducer, but not sufficiently short that there is no overlap between the transmitted and the received signals. This latter requirement is necessary only for the POFM method described below. Following amplification, the received signal may be digitized by a dual-channel 14-bit analog-to-digital converter (ADC) at a 50 MHz digitization rate. For the shaped pulse method, the digitization rate may be increased to 100 MHz. The digitization rate may be adjusted to provide good time resolution for the data, and is not limited to the above rates. Both the excitation and received signal are digitized by the dual-channel ADC and stored in memory for digital processing. The signal processing is carried out by Digital Signal Processor (DSP), 21, and the entire operation of the measurement including the timing of the input signal and its repetition is controlled by the same DSP. A laptop computer may also be used to control the electronics and the DSP through USB. Typically, for crude oil, the upper applied frequency is approximately 5 MHz since higher frequencies are significantly attenuated by the liquid in a 2-in. diameter pipe. The applied frequencies employed also depend on the pipe diameter, 22, or fluid path length. For shorter path lengths, the upper limit of the frequency may be higher than 5 MHz, as the attenuation depends on the path length the signal has to travel. The received signal is captured for a longer duration than the transmit chirp to enable observation of multiple reflections through the fluid from the opposite ends of pipe diameter 22. This allows the measurement of sound attenuation through the fluid inside the pipe and also losses due to acoustic impedance mismatch between the pipe wall and the fluid.

The sound speed in the fluid is derived from the time-of-flight (TOF), which is the time that a signal takes to travel from the transmitter to the receiver through the fluid path, and yields information regarding the composition of the fluid. The relationship between sound speed and fluid composition in a binary system, such as crude oil/water, is well known and can also be derived from a calibration. Since the sound takes a finite time to travel through the wall of the pipe on both sides, this wall-travel time must be subtracted from the total TOF measurement. There are multiple approaches to determining the TOF. One approach, used in embodiments of the present invention, that provides high signal-to-noise (S/N) ratio is the Pulse-Overlap Frequency Mixing (POFM) method, where the transmit signal as a voltage is multiplied by the time-delayed received signal as a voltage, using a multiplier integrated circuit or both signals can first be digitized and multiplied in a digital signal processor (DSP), there being a partial overlap between the two signals. Typically, the chirp duration is adjusted such that the overlap is approximately 50%, but it can be anywhere between about 30% and about 70%. The degree of overlap is related to the processed signal quality. If a linear frequency chirp is used (the frequency of the signal increases linearly with time), the result of the frequency mixing is a combination of a sum and a difference signal. The difference signal is a fixed frequency, whereas, the sum frequency is variable in frequency and is removed using a low-pass filter, or performed digitally. The result is a single frequency sine-wave difference signal $\Delta f$, the wall effects being ignored to illustrate the procedure. A fast Fourier transform, FFT, of the low-pass filtered signal obtained using signal processor, 21, yields sharp difference frequency, which is directly related to the TOF. Since the ultrasound chirp signal bounces multiple times within the thickness of the pipe wall, additional peaks having progressively diminishing amplitude that are separated by a fixed amount, are observed. This frequency peak separation is related to the travel time within the pipe wall, which may be directly measured from this. The processed POFM data from processor 21 is displayed on display, 26, where the first peak (having the largest amplitude) is the time of first arrival of the chirp ultrasound signal.

An alternative method for determining the TOF is signal deconvolution, as shown in display, 28, and will be explained in more detail below, where the received signal is assumed to be a convolution of the input frequency chirp signal with the impulse response function of the transducer-pipe-fluid system.

Another method for determining the TOF is cross-correlation, a mathematical method for determining the best match between the transmitted and the received signal by time shifting the transmitted signal against the received signal one element at a time, and searching for the time where a maximum is observed, the best correlation. In practice, the present inventors have found that for the measurement of a bubbly fluid, the maxima are difficult to identify, and the cross-correlation approach is not as robust as the POFM method. Moreover, the cross-correlation method has side-lobes that appear as spurious peaks that make the central peak identification less robust that that obtained from the POFM method.

High process gain (Process gain=Signal duration×Signal frequency Bandwidth) may be obtained using both of these methods when compared to the common pulse propagation technique, since for a constant frequency bandwidth, a typical pulse duration in a pulse technique is of the order of 1 µs (or less) as compared to the ~100 µs for the POFM or cross-correlation techniques. Therefore, a high signal to noise, S/N, ratio is obtained without significant averaging yielding fast measurements.

Figures 2A, 2B, 2C:
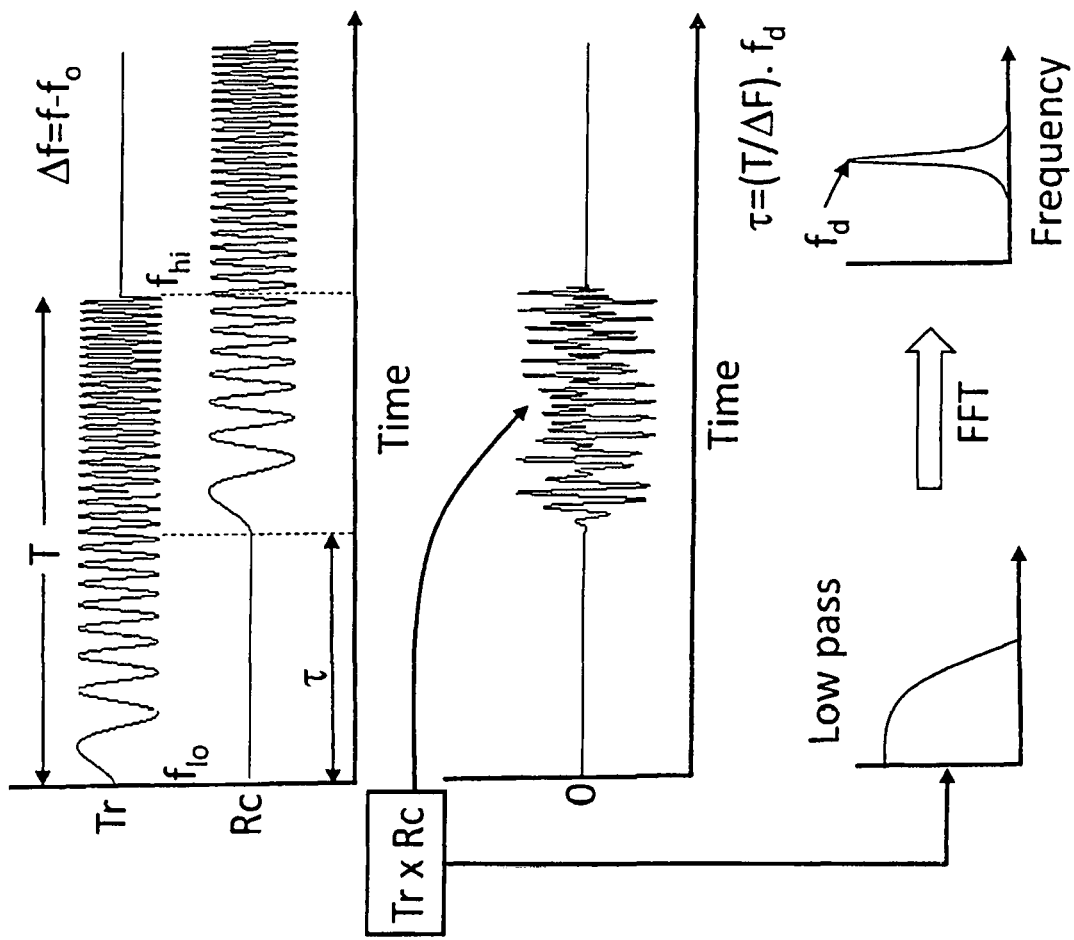
FIGS. 2A-2C schematically describe the principle behind the Pulse Overlap Frequency Mixing (POFM), where

The principle behind the POFM method is schematically further described in FIG. 2. FIG. 2A is a graph of the transmitted ($T_r$) and received ($R_c$) linear frequency chirps as a function of time, showing the overlapping portions as a function of time. As stated, the generated frequency varies linearly with time for a certain duration. The chirp signal arrives at the receiver after a time delay, $\Delta t$ that is dependent on the speed of sound in the fluid and in the wall.

The transmit and the time-delayed received chirped signals can be expressed as:

$$Tr(t) = \sin\left[\left(\omega_0 + \frac{\Delta\omega}{T} \cdot \frac{t}{2}\right)t\right]$$

$$Rc(t-\tau) = \sin\left[\omega_0 \cdot (t-\tau) + \frac{\Delta\omega t}{T} \cdot \frac{(t-\tau)}{2} \cdot (t-\tau)\right]$$

where, the chirp begins at the radial frequency $\omega_0$ ($\omega=2\pi f$, and f is frequency) at time t=0 and ends at frequency $\omega_0+\Delta\omega$ after time T. After a delay time $\tau$ due to propagation through the pipe and the fluid, the same frequency pattern is detected. The multiplication process takes advantage the trigonometric product formula $$\cos(\alpha) \cdot \cos(\beta) = \frac{1}{2}[\cos(\alpha-\beta) + \cos(\alpha+\beta)]$$

where, $$\alpha = \left[\omega_0 + \frac{\Delta\omega}{T} \cdot \frac{t}{2}\right]t, \text{ and}$$

$$\beta = \omega_0 \cdot (t-\tau) + \frac{\Delta\omega t}{T} \cdot \frac{(t-\tau)}{2} \cdot (t-\tau)$$

The result of the multiplication can be expressed as $$Tr(t) \cdot Rc(t-\tau) = \frac{1}{2}\left\{\cos\left[\left(\frac{\Delta\omega}{T} \cdot \tau\right)t + \frac{1}{2}\frac{\Delta\omega}{T} \cdot \tau^2 + \omega_0\tau\right] + \text{higher order terms}\right\}$$

where the various powers of t have been collected inside parentheses as the argument of the cosine, and the higher order quadratic terms are neglected. The effect of multiplication of the original chirp signal with the time-delayed chirp is to create a single frequency $f_d$ at $(\Delta\omega/T)\tau$ and a new chirp starting at $2\omega_0+(\Delta\omega/T)\tau$ and increasing at twice the rate of the original chirp. A low pass filter is used to remove the higher frequency information and only keep the single frequency $f_d$, from which the time delay $\tau$ is extracted.

FIG. 2B is a graph of the multiplication of the $T_r$ and $R_c$ chirp signals as a function of time, and FIG. 2C illustrates the multiplied signal being filtered to remove the sum frequency, the difference frequency, $f_d$, being constant in time as seen in the graph. An FFT of the filtered signal yields a single difference frequency $f_d$. $\tau$, the TOF, is proportional to $f_d$, according to $\tau=(T/F)\cdot f_d$, where T is the duration of the frequency chirp, and F is the chirp frequency bandwidth, $F=F_{hi}-F_{lo}$, the difference between the start frequency and the stop frequency. It should be mentioned that the start frequency need not be lower than the stop frequency, and the direction of the chirp can be reversed.

Guided Wave Problem:

When the fluid being measured inside a pipe is a pure fluid or a mixture of fluids, the techniques mentioned above can be used. However, if the fluid being measured is a bubbly fluid or a fluid with high attenuation, such as heavy crude, separation of the guided wave from the signal passing through the fluid becomes problematic. As is illustrated in FIG. 3A, sound waves introduced into pipe 12 by transducer 10 attached to flat portion, 30, of the outer surface 32 of pipe 12 and powered by function generator 16, do not only travel through the liquid inside the pipe, 34, but also within the pipe wall, 35. Waves, 36, are called guided waves. A similar situation occurs for curved transmitting transducer 10, which is adapted to efficiently couple acoustic energy into a rounded portion of outer surface 32 of pipe 12, as illustrated in FIG. 33. The curved transducers generate less intense guided waves than the flat transducers.

It should be mentioned that it is not a single signal that arrives as guided wave but it consists of multitude of wave packets spread over time (over the duration of the frequency chirp). The guided waves are generated primarily at the wall-thickness mode resonance frequencies and there are at least 5 such resonance frequencies encountered in a typical 2-in. diameter pipe within the measurement frequency range of about 500 kHz to about 5 MHz. The number of resonance frequencies depends on the wall thickness and the sound speed in the wall material. In a 3-in. pipe there are more resonances. As the frequency chirp used is a linear chirp with increasing frequency (it can also be decreasing frequency), each time the excitation frequency coincides with the wall thickness mode resonance frequency, guided waves are generated. These waves are also known as pass bands of the wall, and high-intensity sound can pass through the wall and the liquid at these frequencies as well, as will be described below. Thus, the maximum sound transmission appears to be in packets of sound in both time and frequency as the frequency chirp is linear in time. These sound packets propagate along the circumference of the pipe and also through the liquid across the diameter of the pipe (from the transmitter to the receiver) at two different speeds and interfere at the receiver.

For example, if the pipe diameter is greater than 3 in. (steel pipe having a wall thickness of 6 mm), the two signals arriving at the receiver from the two paths may be separated. However, 2-in. diameter (steel pipe having a wall thickness of 6 mm) is prevalent in the oil/gas industry. If such pipe is filled with water, the received signals from both propagation paths (direct vs. circumferential) arrive approximately at the same time and overlap in time. The amplitude of the direct path signal can become much smaller than the signal along the circumference under various circumstances, bubbly fluid being an important one, making it virtually impossible to determine the TOF through the fluid in a noninvasive manner. Of importance is the relative value between the two paths of propagation as opposed to their absolute values. Ultrasound introduced into a bubbly fluid, particularly when the fluid is crude oil, may be severely attenuated.

Fluid pumped from an oil well is a multiphase fluid, a mixture of oil, water, and gas. The presence of gas can be intermittent or continuous, but it appears in various quantities for different flow regimes, making conventional measurement techniques difficult under these complex flow conditions. The problem of the circumferential wave interfering with the direct path signal, the signal of interest, has been addressed by several approaches, which have been field tested in oil wells.

One approach is to reduce the circumferential wave by clamping the outside of the pipe with various materials. Such materials have to withstand a wide variation in temperature, do not solve the problem effectively, and increase the installation and maintenance costs. Clamps will loosen over time after undergoing repeated changes in temperature, and lose their effectiveness.

Solutions to the Guided-Wave Problem:

A. Simple Subtraction:

The propagation characteristics (e.g., sound speed, attenuation and dispersion) of ultrasound through any fluid will vary depending on its composition and flow properties. By contrast, the propagation of sound along the circumference of a pipe is essentially constant for all practical purposes. There are small variations due to interaction of the guided waves with the fluid inside the pipe, and for large variations in temperature, ~100° C., with the latter variations being dependent primarily on the variation in thermal expansion (or contraction). The effect of temperature on the elastic properties of the wall material is small, and can be neglected for the temperature variations encountered in an actual oil field. If the temperature is measured, such variations can readily be corrected as the variation is found to be linear with temperature. Temperature measurements of the fluid can be used to correct the measured speed of sound. Fluid loading primarily affects the amplitude of the waves, and can be corrected for. Effects due to the presence of water and oil are also small, and can be neglected for all practical purposes.

Figure 4:
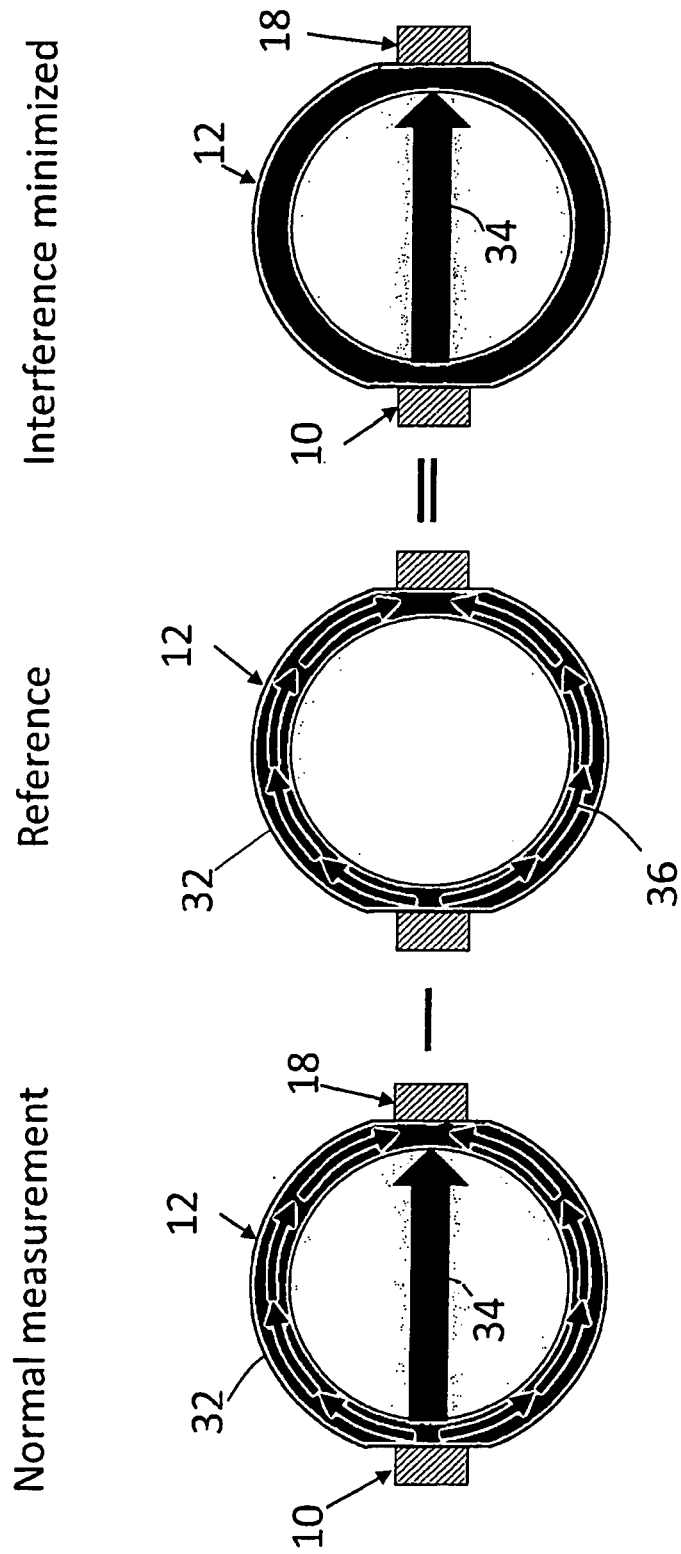
FIG. 4 is a schematic representation of the present subtraction method, illustrating the minimization of the effect of guided waves on the measurement of the sound speed in a fluid.

FIG. 4 is a schematic representation of the present subtraction method. First, frequency chirp measurements may be obtained using an empty pipe that will be used for subsequent measurements, and that data saved as reference. The present inventors have found that obtaining a reference signal using a pipe filled with liquid (e.g., with water) and pumping sufficient gas into the system to achieve >60% gas volume fraction (GVF), is more effective since the GVF value guarantees that no direct path signal can propagate through the liquid due to sound scattering by the gas and therefore the detected signal is that from guided waves propagating along the circumference. An added advantage is that any possible fluid loading effects are taken into account. Fluid loading effects do not change much independent of whether the liquid is water or crude oil, the variation being negligible for all practical purposes. The reference measurement is illustrated in the pipe in the middle of FIG. 4. Measurements are then made with whatever fluid is to be observed. The dual-path propagation measurement is illustrated in the left-hand pipe of FIG. 4, while the right-most pipe illustrates how the present subtraction method minimizes the interference. This subtraction can be accomplished either in the time domain or in the frequency domain. However, the subtraction in the time domain is simpler where the reference received signal is subtracted from the measured signal.

Figure 5A:
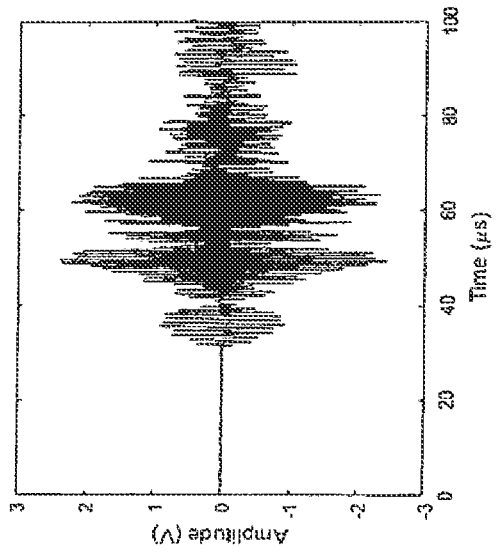
FIGS. 5A and 5B are graphs of a received signal in response to a frequency chirp excitation for an empty steel pipe (spool) and for the same pipe filled with water, respectively.
Figure 5B:
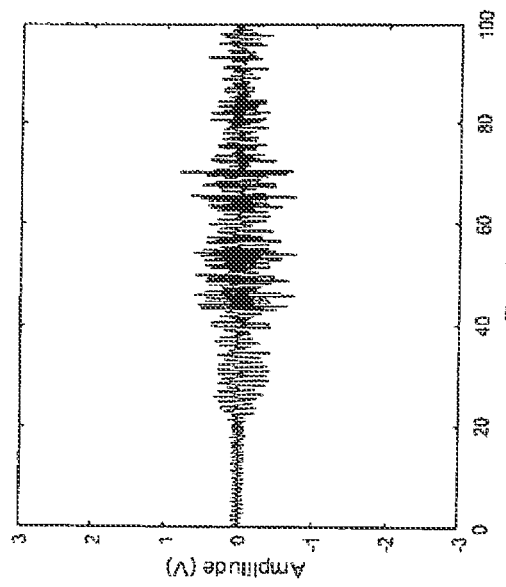

The effectiveness of the present subtraction method is illustrated in FIG. 5 using the chirp transmission measurements described in FIG. 1, hereof. FIGS. 5A and 5B are graphs of a received signal in response to a frequency chirp excitation for an empty 2-in. diameter (ID=1.75 in.), 3 ft. long vertical steel pipe (spool), and for the same pipe filled with water, respectively. The thickness of the wall corresponds to a total propagation time of 2 μs. The propagation of sound through water is efficient and the received signal is much stronger than for an empty pipe.

Figure 5C:
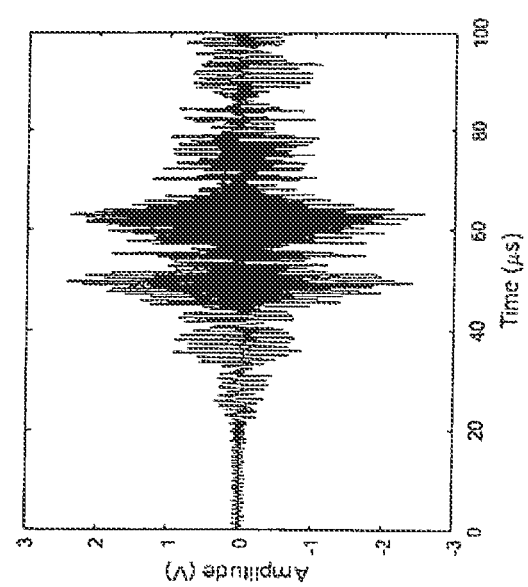
FIG. 5C is a graph of the amplitude versus time for the difference in amplitude between the two received signals using a simple algebraic point-by-point subtraction.

FIG. 5C is a graph of the amplitude versus time for the difference in amplitude between the two received signals using a simple algebraic point-by-point subtraction. The signal in FIG. 5C appears significantly cleaner than the original signal shown in FIG. 5B. The initial arrival of the guided wave is almost completely eliminated and the detected signal amplitude is approximately zero until the arrival of the signal through the liquid (and the wall thicknesses) as indicated by the arrow. The TOF may be determined from this subtracted waveform. The amplitude modulated portion shows the enhancement in signal transmission due to increased transmission at wall-thickness mode resonances of the pipe wall as mentioned above.

As stated, the sound speed in the fluid is related to the fluid composition. The sound speed is determined from the time-of-flight (TOF) in the fluid which may now be accurately determined by the POFM method, as described above, and the deconvolution method.

When a signal passes through any system, the system modifies (filters) the signal based on the characteristics of that system and the observed signal on the other end is that modified signal. Mathematically this process is called a convolution process where the original signal is convolved by the system to produce a modified signal. Deconvolution is an algorithm-based process used to reverse the effects of convolution on recorded data. The process is also termed inverse filtering since it reverses the filtering process. The concept of deconvolution is widely used in the techniques of signal processing and image processing. In general, the object of deconvolution is to find the solution of a convolution equation of the form: f·g=h, where h is the measured signal (typically at the output of some instrument), and f is the original input signal that is to be recovered from the measurement. The function g is the transfer function of the instrument. If g is known, f can be recovered. In accordance with the teachings of embodiments of the present invention, the frequency response characteristics (transfer function) of the pipe-wall-liquid-pipe-wall system is determined from the input excitation signal and the received signal. This is different from the conventional approach of recovering the input signal once one knows the transfer function. A frequency chirp signal is directed through the pipe and the amplitude modulated frequency chirp is observed. It should be stated that there is no need for an overlap in the transmitted and received signals, as required for the POFM method; therefore, no signal is wasted. From this information the frequency response of the pipe system is obtained using the deconvolution process. This frequency response is then converted to a time response of the pipe system, also known as the impulse response. This is equivalent to learning how the pipe system will behave if a very sharp and clean impulse is used as the excitation signal instead of a frequency chirp. This in turn gives provides the information about how such a pulse will propagate through the pipe system and therefore, the TOF may be obtained from this data. A frequency chirp and its associated process gain can then be used to obtain the same results as if a very sharp pulse is used to make that measurement. The sharpness of the impulse is limited by the bandwidth of the transducers used and, therefore, broadband transducers provide better results. The advantage this method has over the POFM method is that the information is derived from the entire recorded data (both input and output) and not from the overlapped region, which essentially throws out half the data. The deconvolution process is very fast and simply uses a division of two FFTs that can be rapidly carried out in modern DSP systems.

As stated above, in the deconvolution method, the received signal is assumed to be a convolution of the input frequency chirp signal with the impulse response function of the transducer-pipe-liquid system. That is, the input signal is modified by the transducer-pipe-wall-liquid-pipe-wall-transducer as it propagates through it and appears as the received signal. The impulse response describes the reaction of the system as a function of time due to an impulse. The impulse response contains the information regarding pulse propagation through the system, and the TOF can be determined from this information. By deconvolving the impulse response function of the system from the excitation (input) signal and the received signal, the required TOF can be obtained as follows:

$$\text{Impulse Response} = \text{Real}\left[IFFT\left(\frac{FFT(R)}{FFT(T)+\lambda}\right)\right]$$

where, FFT(R) and FFT(T) are the Fourier Transforms of the Received and Transmitted signals, respectively, the parameter λ is the Tikhonov regularization parameter, which is a small number (its actual value is not important) that prevents denominator from becoming zero, and IFFT is the inverse Fourier transform that converts the deconvolved signal to the time domain so that one gets a time response. This deconvolution may be achieved in a number of ways, and this is only an example. The final result of the deconvolution is similar to the results obtained using the POFM method, but the signal is much cleaner and sharper.

Figure 6A:
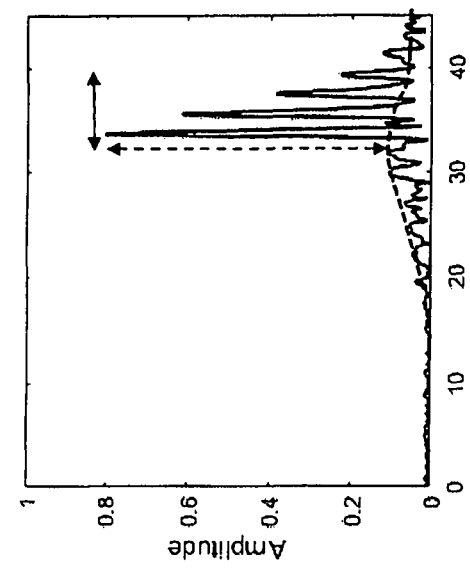
FIGS. 6A 6C show the analysis of the data presented in FIG. 5 hereof using the deconvolution method, where
Figure 6B:
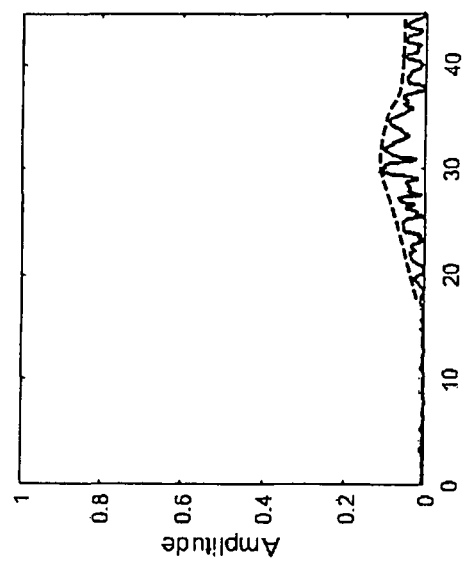

FIG. 6 shows the analysis of the data presented in FIG. 5 hereof using the deconvolution method. The result is similar to that obtained using the POFM method. FIGS. 6A and 6B are the deconvolved impulse response of the transducer-pipe-wall-fluid-pipe-wall-transducer system for an empty pipe and a water-filled pipe, respectively, which correspond to the chirp data shown FIGS. 5A and 5B, respectively. FIG. 6A is a graph of the sound propagation as guided waves as a function of time, the dashed line being an envelope of the data since there are many modes present that arrive at different times. FIG. 6B is a graph of the sound propagation through the liquid superimposed on the guided wave signal as a function of time. The multiple peaks having decreasing amplitudes are the multiple reflections within the pipe wall within its thickness. Similarly to the POFM procedure described above, the spacing in time of these peaks is 2 μs (rounded) for the 2-in. pipe used. This is the same effect observed in the amplitude modulation of the transmitted signal shown in FIG. 5B hereof. The first large peak in FIG. 6B is the first-arrival information, which is the signal that arrives at the receiver first through the direct path and represents the total time taken for sound to propagate from the transmitter transducer to the receiver transducer through the pipe wall and through the fluid inside the pipe. The TOF through the liquid is obtained by subtracting the time delay through the pipe wall, which is 2 μs.

As the fluid composition inside the pipe changes, this peak (along with the multiple reflection peaks) moves to longer times (see horizontal line with arrows) because the sound speed in oil and, consequently, in an oil-water mixture is less than that of water. However, sound attenuation increases in an oil-water mixture as the proportion of oil increases. Therefore, the amplitudes of the peaks decrease with the water-oil ratio, which is shown by the vertical dotted line. It should be pointed out that the signal in FIG. 6A is also present in FIG. 66 and the two signals are actually superimposed, which distorts the observed signal shapes of the peaks and can introduce error in the determination of the TOF. When gas is introduced into the fluid, the attenuation increases and beyond a certain GVF value (~50%), there is no detectable signal. However, even above 10% GVF significant attenuation of the liquid path peak occurs and the peak can become obscured by the background guided wave signal. It is possible to disregard any peak beyond a certain time threshold, but that approach fails beyond a certain GVF in the fluid, and particularly for higher water-cut fluids. Time thresholding is effective if the fluid composition is such that the first arrival peak is farther removed from the primary interfering guided wave signal and the fluid attenuation is not sufficiently high that the signal from the fluid falls below the envelope of the guided wave. If the guided wave signal envelope is considered as the background noise floor, the signal-to-noise (S/N) ratio (the highest peak amplitude value to envelope amplitude ratio) is less than 10.

Figure 6C:
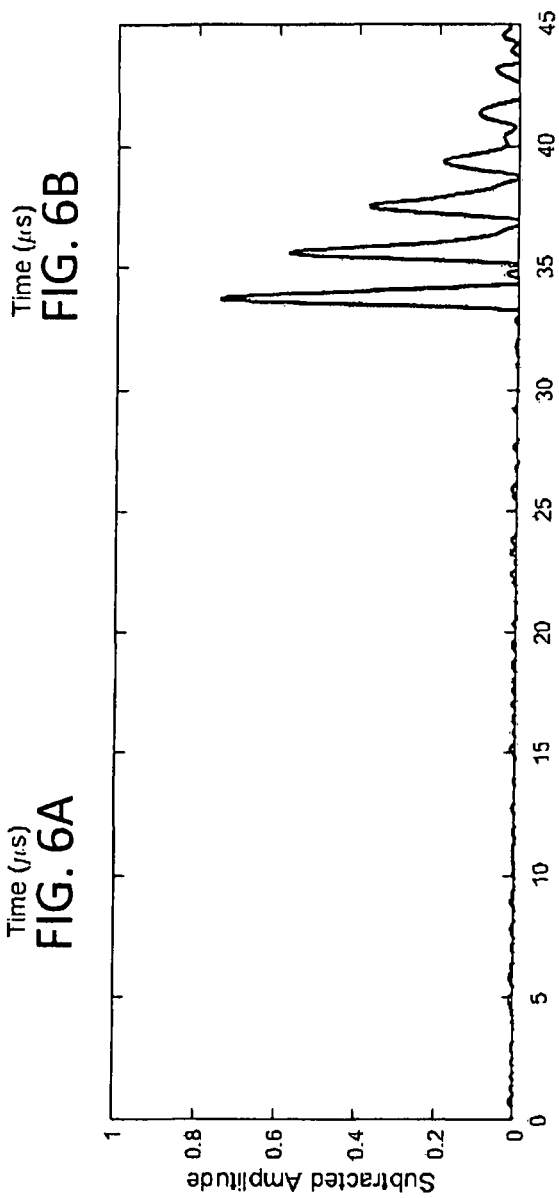

FIG. 6C shows the benefit of the subtraction technique. The noise floor has practically disappeared and the S/N ratio has increased to about 70. The resulting signal is clean and the correct peak for the TOF can be determined. This works well for extracting fluid signals which would otherwise be obscured in the background noise. The characteristic peak pattern (see, FIG. 6C), can also be used to extract signals buried in the noise in addition to signal subtraction. This pattern is related to fluid density (the impedance mismatch between the pipe wall and the fluid inside). It should be mentioned that it is not necessary to actually measure the wall thickness of the pipe (often a difficult thing to do for special shaped pipes) as the sound transmission time through the pipe wall can be determined accurately from the multiple reflection peaks.

FIGS. 7A(a) and 7B(a) show the POFM-processed data for a process water-filled oil field pipe for a strong signal. In the case of high quality signals, the effect of the subtraction of the reference is minimal, and the determination of the TOF simply requires locating the first peak. FIGS. 7A(b) and 7B(b), by contrast, show data from a situation where the fluid attenuation is high due to the fluid being highly attenuating crude oil and gas. In this situation, the signal is small and comparable to the background signal (circumferential mode) and it is not possible to determine which peak is the correct peak for the TOF measurement. Normally, the first large peak would be selected; however, this is the incorrect peak in this case. FIG. 7B(b) is a graph of the processed received signal, but with the reference signal obtained using an empty pipe having been subtracted from the received time domain data before POFM processing is performed. The resulting data appears almost identical to the water data illustrated in FIG. 76(a), which has little attenuation. The correct peak is now readily located and the correct TOF determined. The distortion in the peak is also noticeable due to superposition of two signals as indicated by the vertical dashed line in the FIGS. 7A(b) and 7B(b). There is also a slight horizontal shift of the peak, and without subtraction this would have introduced error. Even when the liquid peak is lower than the guided wave background envelope, the present subtraction method can extract the correct peak and the subsequent determination of sound speed.

B. Shaped Pulse:

As mentioned above, the traditional approach for determining TOF is to use either a cross-correlation scheme to localize the signal transmission time or to use the POFM technique. Both of these methods require additional signal processing, and are useful when the received signal is noisy. The POFM method requires that a fraction 50%) of the excitation pulse overlaps with the transmitted signal (see FIG. 2, hereof) and, therefore, its duration is dictated by the path-length (e.g., the pipe diameter). Another method in accordance with embodiments of the present invention involves the use of a shaped pulse, such as a Gabor pulse, also known as a Gaussian modulated sine pulse. This pulse shape provides simultaneous time and frequency localization. The time localization of the Gabor pulse is better because the pulse energy is concentrated near the center. This localization property is useful for identifying the arrival time of the pulse, the TOF.

The Gaussian modulated waveform is given by:

$$f(t) = \exp[-t^2/2\sigma^2]\cos(2\pi f_c t)$$

Where $f_c$ is the center frequency and the pulse-width is $2\pi\sigma$. The Fourier transform of this waveform is given by:

$$F(\omega) = \frac{1}{2}\sigma\sqrt{2\pi}\left[\exp\left[\frac{-\sigma^2(\omega-\omega_0)^2}{2}\right] + \exp\left[\frac{-\sigma^2(\omega+\omega_0)^2}{2}\right]\right]$$

It should be mentioned that a Gaussian waveform is not a transmittable pulse due to the non-existence of the derivative at time t=0. In other words, the frequency domain contains a DC component that does not propagate. The Gaussian modulated sine pulses provide good spectral control.

Most commercial instruments use a pulse that is derived from a step function or another function that generates a short pulse which decays quickly in time. That is, these instruments generate a short pulse without any predefined shape, since that would require more sophisticated electronics. No consideration is taken of the pulse time-bandwidth product (TBP). The time-bandwidth product of a pulse is the product of its temporal duration and spectral width (in frequency space). To take the full advantage of the bandwidth of the transducer used and to provide the optimum energy transfer and temporal localization, the time-bandwidth product of the pulse shape used must be considered. A Gaussian modulated sine pulse has the narrowest pulse width for any given bandwidth. Narrow pulse widths are important for accurately determining the pulse propagation time and identifying its peak. The Sine pulse is bandwidth limited and also provides excellent TBP. A bandwidth-limited pulse (also known as Fourier-transform-limited pulse, or more commonly, transform-limited pulse) is a pulse of a wave that has the minimum possible duration for a given spectral bandwidth. Keeping pulses bandwidth-limited is necessary to compress energy in time and to achieve high intensity sound with less excitation power than a more traditional system.

The present inventors have found that such pulses arrive at the receiver in a very clean form and can be easily observed and measured. Other pulses (commercial instruments) become distorted during transmission through any multiphase fluid, and it is difficult to both define and identify a peak. For a 2-in. diameter steel pipe, the signal that arrives through the circumferential path arrives first but is very small in amplitude when compared to the signal traveling through the fluid inside the pipe, which can be clearly defined without any ambiguity or distortion, as shown in FIG. 8.

Figure 8:
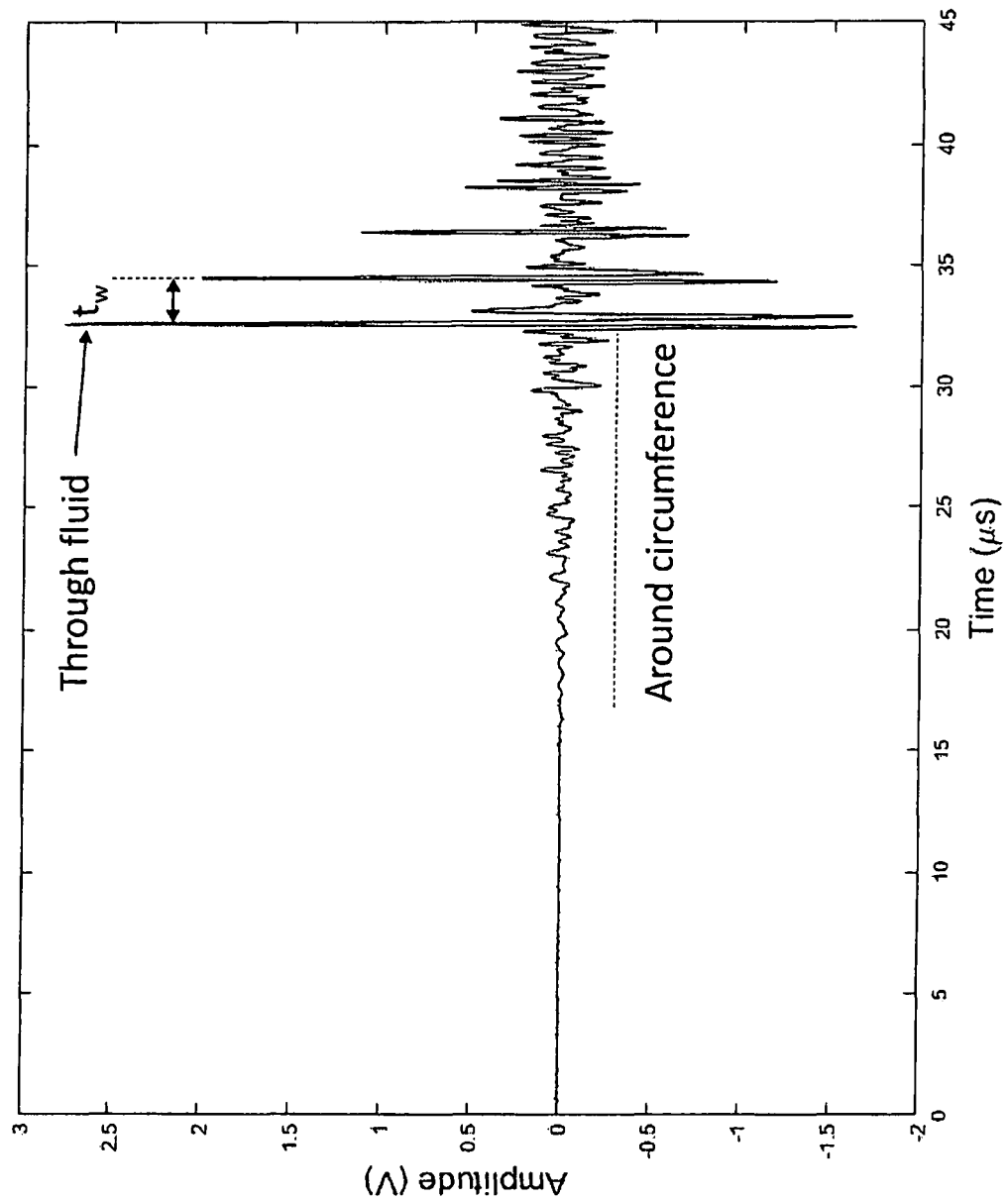
FIG. 8 is a graph of the detected signals in response to a Gabor pulse, one arriving first through the circumferential path, but being very small in amplitude when compared to the signal traveling through the fluid inside the pipe (sharp peak around 33 µs), which can be clearly defined without any ambiguity or distortion.

In FIG. 8, the sharp peak around 33 µs is the propagation of a Gabor pulse through the pipe diametrically across from the transmitter transducer to the receiver transducer (see FIG. 1 hereof). The circumferential waves are generated much earlier and may be observed starting at about 20 µs. There are many guided modes generated and each mode travels at a different frequency. Once generated these guided waves persist for a while and superimpose on the direct signal through the liquid as can be seen by the slightly noisy signal along the base line (near zero amplitude). The signal-to-noise ratio is quite high and the large peak that is the so-called first arrival of the transmitted pulse can readily be detected. The effect of the guided waves may be subtracted to further improve the signal-to-noise ratio. The subsequent smaller peaks are due to multiple reflections within the pipe wall thickness. These peaks are equidistant in time and provide an accurate measure of the pipe wall thickness if the material of the pipe is known (typically steel). The amplitude decay rate of the subsequent peaks provides a measure of the energy loss due to reflections from the wall-liquid interface, which is related to liquid density since the density of the pipe wall is known. It should be stated that due to the short duration of the Gabor excitation pulse (~5 µs) as compared to a chirp signal (>60 µs for a 2-in. pipe and greater for larger pipes), the guided waves generated appear to be much lower in amplitude. This significantly helps in the determination of TOF in the fluid. To determine the correct TOF, the propagation delay time through both sides of the pipe wall ($2t_w$) is subtracted ($t-2t_w$), where t is the time-of-flight of the signal between the transmitting and receiving transducers, and $t_w$ is the travel time through a single wall thickness. This assumes that the start time, t=0, is at the peak of the Gabor pulse excitation.

Figure 9:
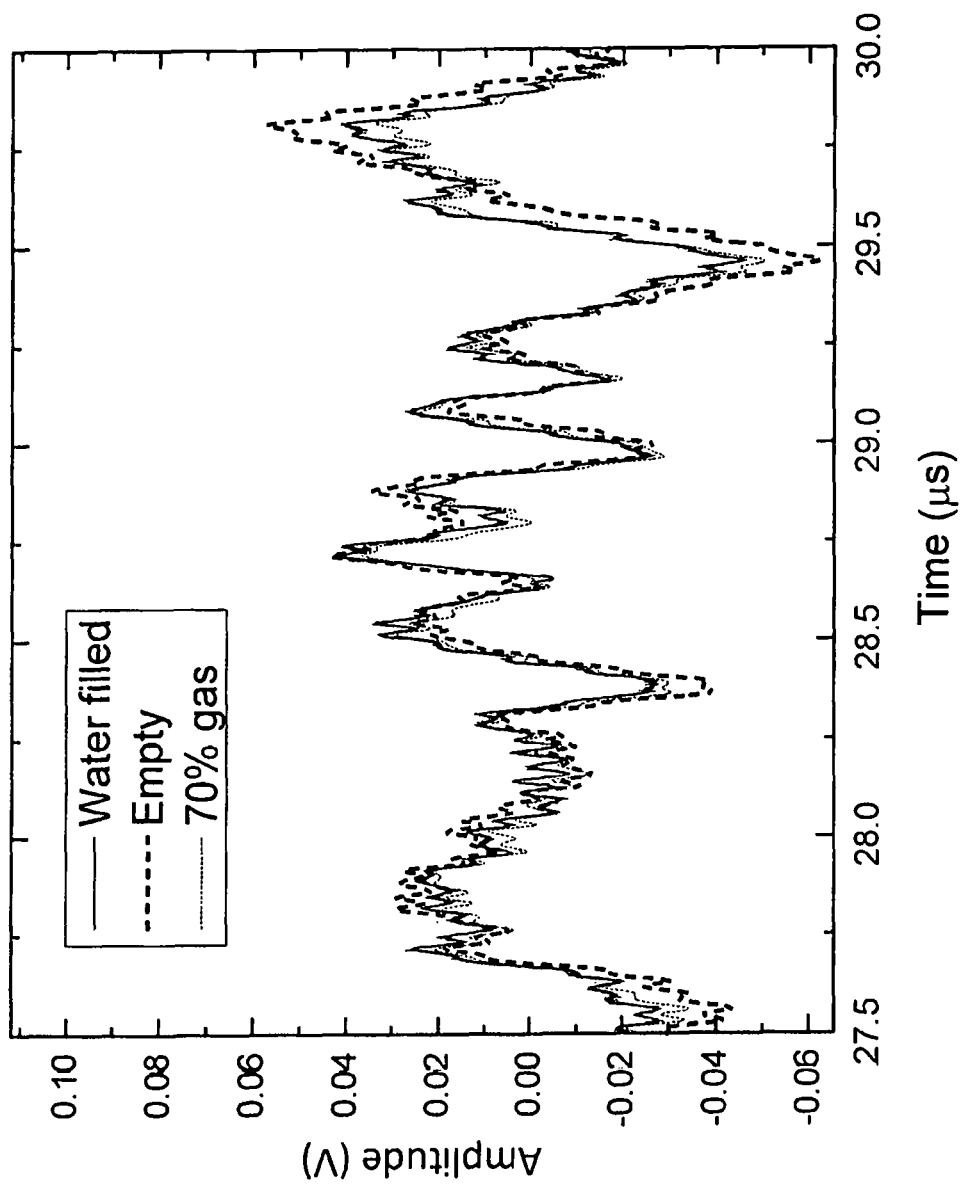
FIG. 9 is a graph illustrating the effect of fluid loading on the guided wave signal where transmission measurements were made under three conditions: (1) an empty pipe so that all the sound travels around the circumference to reach the receiver transducer; (2) a water-filled pipe that has dual path propagation; and (3) a pipe filled with nearly 70% gas, which blocks all signal through the direct path but shows the loading effect of the fluid near the pipe wall, only the baseline information being shown on an expanded scale (prior to any liquid peak) in order to compare the different signals.

FIG. 9 shows the effect of fluid loading on the guided wave signal where transmission measurements were made under three conditions in a 2-in. diameter pipe: (1) an empty pipe so that all the sound travels around the circumference to reach the receiver transducer; (2) a water-filled pipe that has dual path propagation (See FIG. 3, hereof); and (3) a pipe filled with nearly 70% gas, which blocks all signal through the direct path but shows the loading effect of the fluid near the pipe wall. In FIG. 9, only the baseline information is shown on an expanded scale (prior to any liquid peak) in order to compare the different signals. As may be observed, the effect due to fluid loading is small when probed with this fast pulse. This permits subtraction of the baseline signal as a reference signal measured using either an empty pipe or a gas-filled pipe (having high gas content which completely blocks all direct path transmitted signals).

Figure 11:
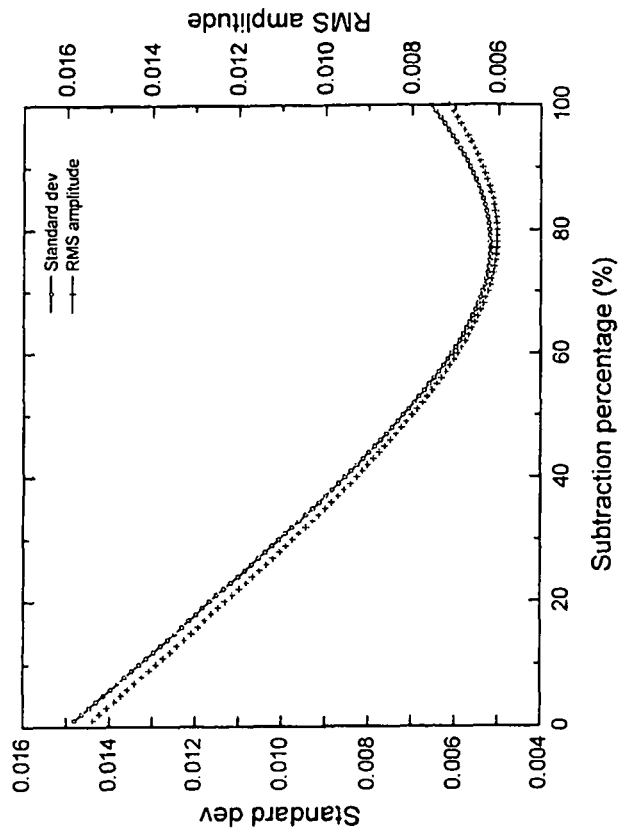
FIG. 11 is a graph of the optimized subtraction of the reference baseline, where the root-mean-square amplitude and its standard deviation is measured for the subtracted signal as a percentage of the quantity of reference signal subtracted from the signal obtained from a fluid-filled pipe, for this pipe geometry and configuration, the optimum value being 75% of the reference signal.
Figure 10:
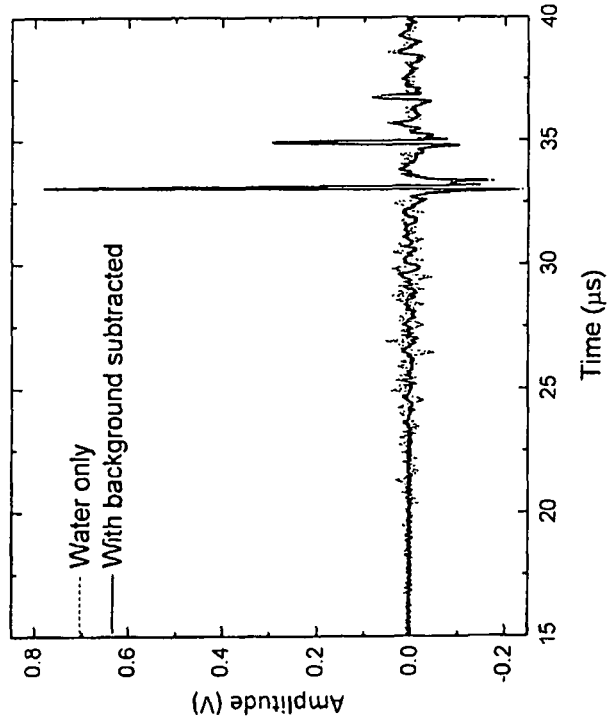
FIG. 10 is a graph illustrating the improvement in signal-to-noise ratio using the present reference background subtraction.

FIG. 10 illustrates the improvement in signal-to-noise ratio using the reference background subtraction of embodiments of the present invention, which is clearly noticeable. Typically, only a fraction of the reference baseline amplitude is subtracted. There are no liquid peaks in the data measured for an empty pipe or a gas-filled pipe and, as is expected, a simple baseline is obtained, as shown in FIG. 10. The optimized subtraction of the reference baseline is illustrated in the FIG. 11, where the root-mean-square amplitude and its standard deviation is measured for the subtracted signal as a percentage of the quantity of reference signal subtracted from the signal obtained from a fluid-filled pipe. For this pipe geometry and configuration, the optimum value is 75% of the reference signal. That is, Optimum Signal=fluid-filled signal−0.75×Reference signal Again, the reference signal can be either measured using an empty pipe or a pipe that is filled with >60% gas. The improvement in signal-to-noise ratio is approximately a factor of 3 (or 10 dB) in this case. The improvement is significantly greater when the fluid path signal is comparable to the background signal envelope. The subtraction method can effectively extract signals completely buried in the background noise.

Figure 12:
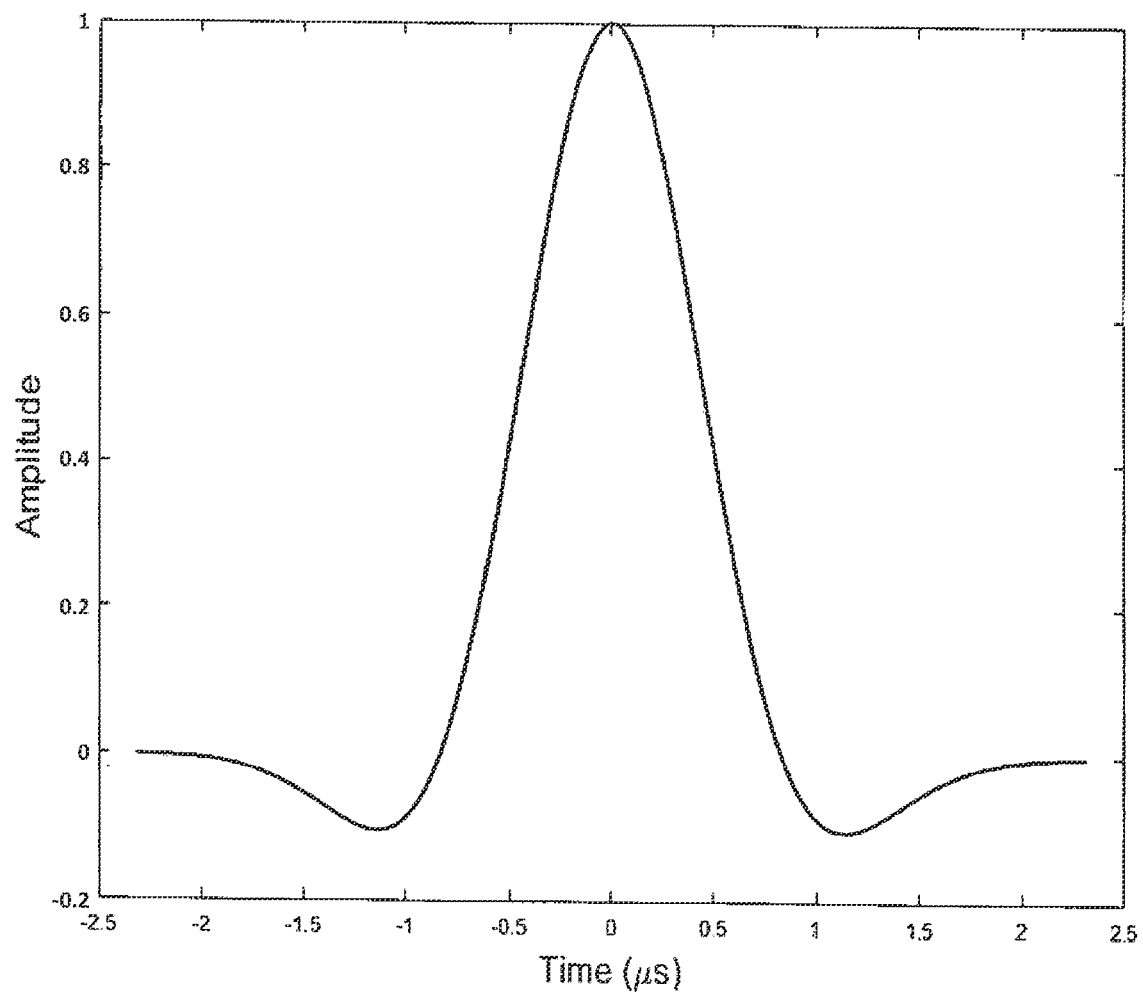
FIG. 12 shows an example of a pulse which permits accurate measurements.

The shaped pulse method thus permits an accurate and simple procedure for measuring the TOF. The peak is determined directly from the received voltage output signal from the receiver transducer without requiring sophisticated processing, such as POFM or cross-correlation. Arbitrary selection of the pulse shape will generally not yield a good result. For example, commercial instruments generate the following pulses: (1) a steep pulse to obtain the shortest pulse duration (high excitation voltages are employed); (2) step function excitation; or (3) a tone burst. Such pulses are adequate for nondestructive testing and measurements in solids. However, they do not provide clean peaks for measurements in multiphase fluids. An example of a pulse which permits accurate measurements is illustrated in FIG. 12. The symmetric dips on both sides of the principal peak end with zero amplitude.

The digitization rate for the data acquisition system suitable for the analyses described above is 50 MHz, although 25 MHz should be sufficient, and 200 MHz can provide even better time resolution if sensitive changes in the fluid are required to be monitored. Use of frequency chirps with cross-correlation or POFM methodology without pipe-noise subtraction failed to identify the peak even with this acquisition speed. Cross-correlation analysis is effective for single-phase fluids, but is plagued with side-lobes that often make peak determination difficult when the transmitted signal through the direct path is low. The ability to accurately and readily detect the liquid peak simply from the digitized data significantly simplifies the measurement and the measurement rate. Measurement rates exceeding 1 KHz are possible, which are necessary for high flow rates and in systems that have significant fluctuations, such as turbulence. At high fluid flow rates the measurement quality has been found not to degrade, and obtained curves are similar in appearance to those of FIG. 10. Reference subtraction is generally unnecessary for fluid measurements under flowing conditions so far tested up to 2000 barrels per day. The lower flow rate can be an approximately static fluid. Accurate measurements have also been made in water up to a GVF of 60% in both 2-in, diameter and 3-in. diameter pipes.

Thus, in accordance with embodiments of the method of the present invention, measurements can be made with a GVF as high as 60% without the need for subtraction.

In the presence of gas, however, the peak signal amplitude (not the time of the peak) fluctuates due to the dynamic nature of the multiphase fluid. Since the measurements can be made at a high pulse repetition rate, it is straightforward to time average a number of pulses (anywhere from 10-200 averages depending on the GVF). The averaging speed is limited by the electronics. Since for a 2-inch pipe, the measurement time is of the order of 50 µs, 100 averages can be accomplished in about 5 ms.

Therefore, high quality measurements can be made with the present method using simple and inexpensive electronics.

Figure 13:
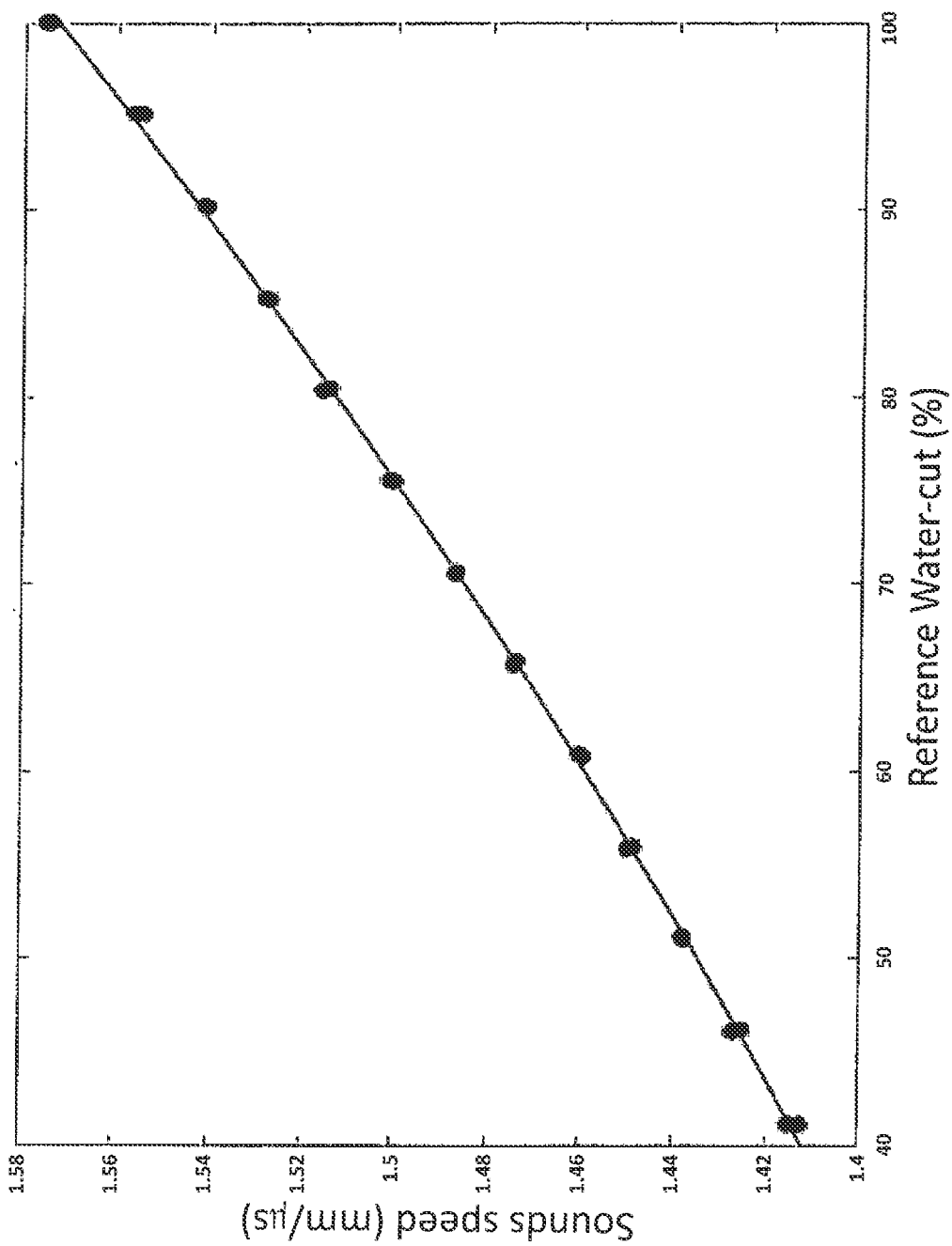
FIG. 13 illustrates the results of the subtraction method where the water cut is varied and the sound speed is determined for crude oil-water mixture flowing at 1000 barrels per day through 2-in. diameter pipe, measurements having the same oil-water ratios being taken two weeks apart, the solid curve being a curve fitted to the data representing the conversion of sound speed to composition (water-cut) over a wide range of oil-water ratios.

FIG. 13 illustrates the results of the subtraction method where the water cut is varied and the sound speed is determined for crude oil-water mixture flowing at 1000 barrels per day through 2-in. diameter pipe. Measurements having the same oil-water ratios were taken two weeks apart. The repeatability of the measurements (shown by the circles) is excellent. The solid curve is a curve fitted to the data and represents the conversion of sound speed to composition (water-cut) over a wide range of oil-water ratios.

Figure 14:
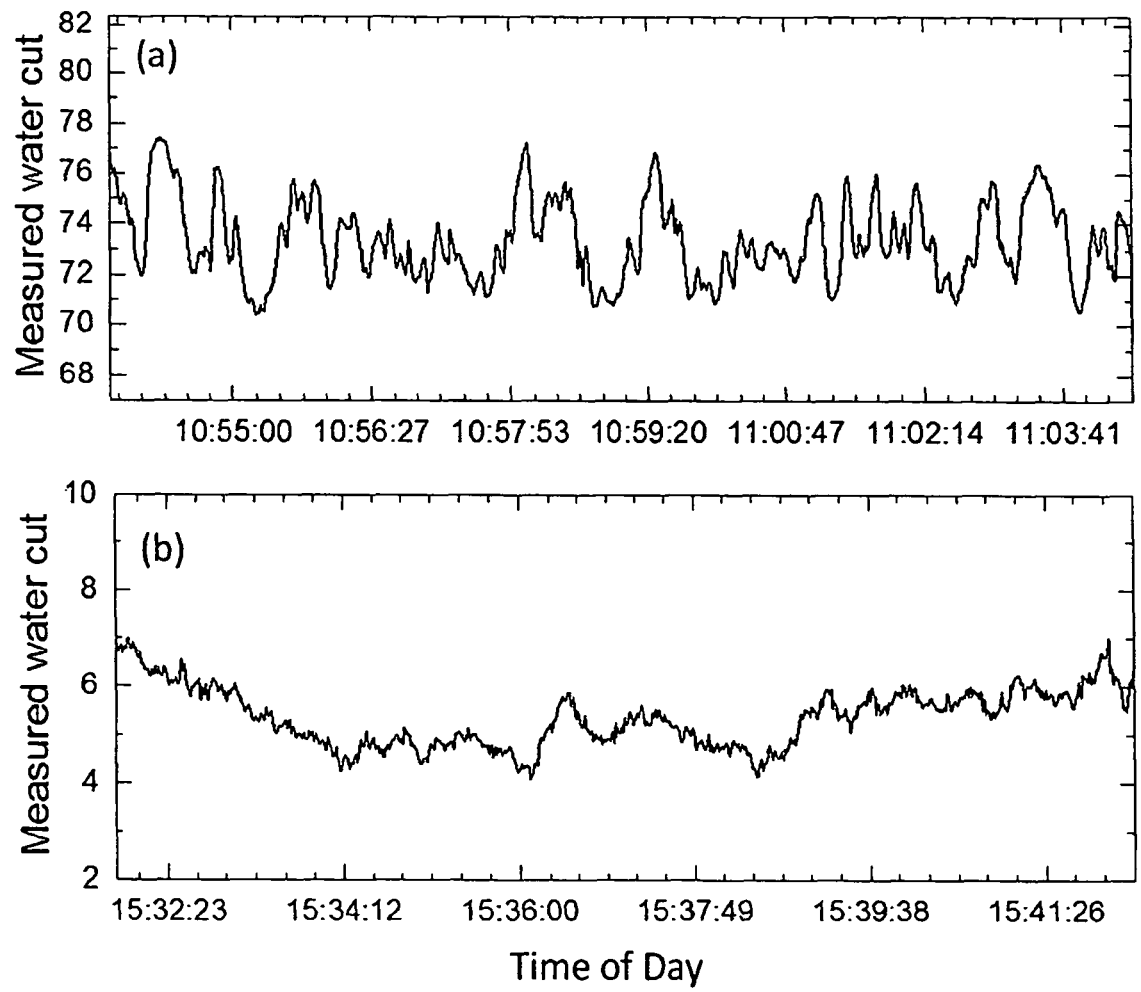

FIG. 14 illustrates the use of the subtraction method for enabling the measurement of small variations in composition over time in a flowing crude oil-water mixture. Without subtraction the data would be noisy and the correct peak would not be able to be located with reliability. FIG. 14(a) shows the dynamics of the flow and its composition variation for high water-cut situation (water-cut ~80%). There are large fluctuations in composition as that reflects the hydrodynamics of the fluid. FIG. 14(b) shows the dynamics for a lower water-cut (~20%). Because of the higher viscosity of the fluid, the fluctuations are damped. Thus, the shaped-pulse method demonstrates the observation of fluid dynamics in a noninvasive manner. Typically, such measurements are performed using optical methods through transparent pipes and transparent fluids, which are not applicable for crude oil since the fluid is not optically transparent.

C. Other Methods:

1. Selective Frequency Excitation:

When a pipe or a plate is excited with an ultrasonic transducer, guided waves (e.g., Lamb waves) are generated. These waves are a family of elastic waves, but are bounded by the two surfaces of a plate, requiring a boundary for their existence. The propagation of these waves are highly dispersive meaning the speed of propagation depends on the frequency. Measurements in accordance with the teachings of the present invention are typically in the frequency range (>500 kHz in a 44-mm ID tube with a thickness of 6 mm. In the frequency range between about 500 kHz and about 7 MHz, the guided modes are strongly excited at the same frequencies that match the thickness mode resonance of the pipe wall. At the wall thickness mode resonance the sound transmission through the pipe wall reaches a maximum.

Figure 15B:
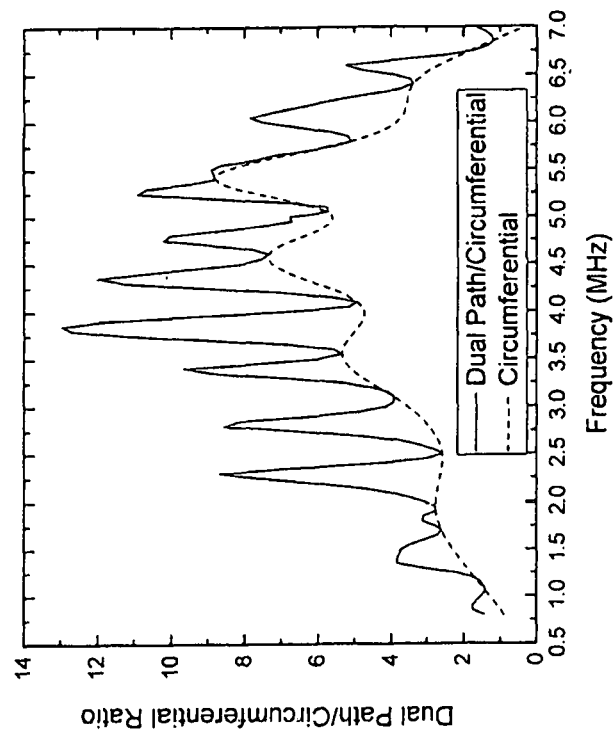
FIG. 15B shows signal-to-noise ratio enhancement derived from the ratio of the two curves, the baseline dashed curve showing the effect of the guided wave.
Figure 15A:
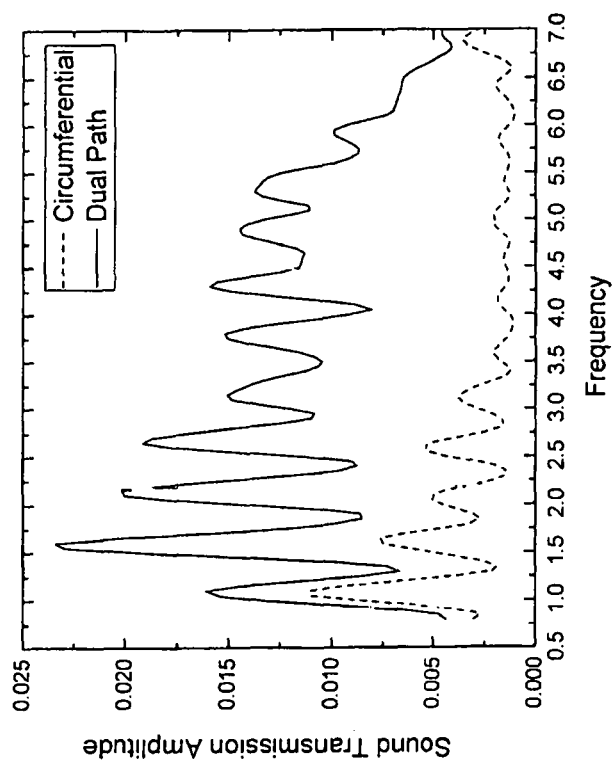
FIG. 15A shows measurements made with an empty pipe and the same pipe filled with water, the sound transmission in this case is much higher as shown by the solid curve.

FIG. 15A shows measurements made with the pipe empty and the same pipe filled with water. When the pipe is empty, sound wave propagation through the circumferential path is detected. As already discussed, when the pipe is filled with a fluid, there are two paths of propagation. The sound transmission in this case is much higher and is shown by the solid curve. There are frequencies where the signal transmission ratio is higher than at other frequencies. FIG. 15B shows signal-to-noise (S/N) ratio enhancement derived from the ratio of the two curves. The baseline dashed curve shows the effect of the guided wave. Both curves in FIG. 15B show larger signal near the middle of the frequency axis, which is related to the center-frequency (5 MHz) of the transducer and the transducer bandwidth. At frequencies that correspond to the wall resonance frequency, there is enhanced signal transmission as well as improved signal-to-noise ratio. Thus, although it is not possible to completely eliminate the circumferential mode, it is still possible to enhance the signal by using selective excitation at these frequencies. The improvement can be as much as 500% over not using those specific frequencies or frequency bands centered on those frequencies. There are multiple ways of applying this method. First, the signal can be excited with a narrow band (frequency chirp of 10 µs-20 µs duration directed through a band-pass filter), or a fixed frequency tone burst (a few cycles of any selected frequency). Typically, the pulses employed are shorter in duration than the time-of-flight of the signal through the fluid. For example, less than one-half the time-of-flight between the transmitting and the receiving transducers. The second method creates a modified frequency chirp waveform using an Arbitrary Waveform Generator (AWG) that is not continuous in frequency, but has interrupted frequency bands where the frequencies that correspond to the valleys in the signal transmission (see FIG. 15B) are removed. That is, the same frequency chirp excitation signal is used, but certain frequency regions are zeroed out such that the modes corresponding to those frequencies are not generated, thereby reducing interference. The POFM method can be used for a modified waveform such as this.

2. Guided Wave Decay:

The guided waves described above decay in amplitude with time much faster than the signal through a liquid that is not highly attenuating. Therefore, if the measurements are delayed to allow these waves to die down to an acceptable level, then accurate measurements of TOF in the fluid can be made. By acceptable level it is meant that the correct peak due to the sound transmission in the liquid can be correctly identified without the interference due to the guided wave.

Figure 16:
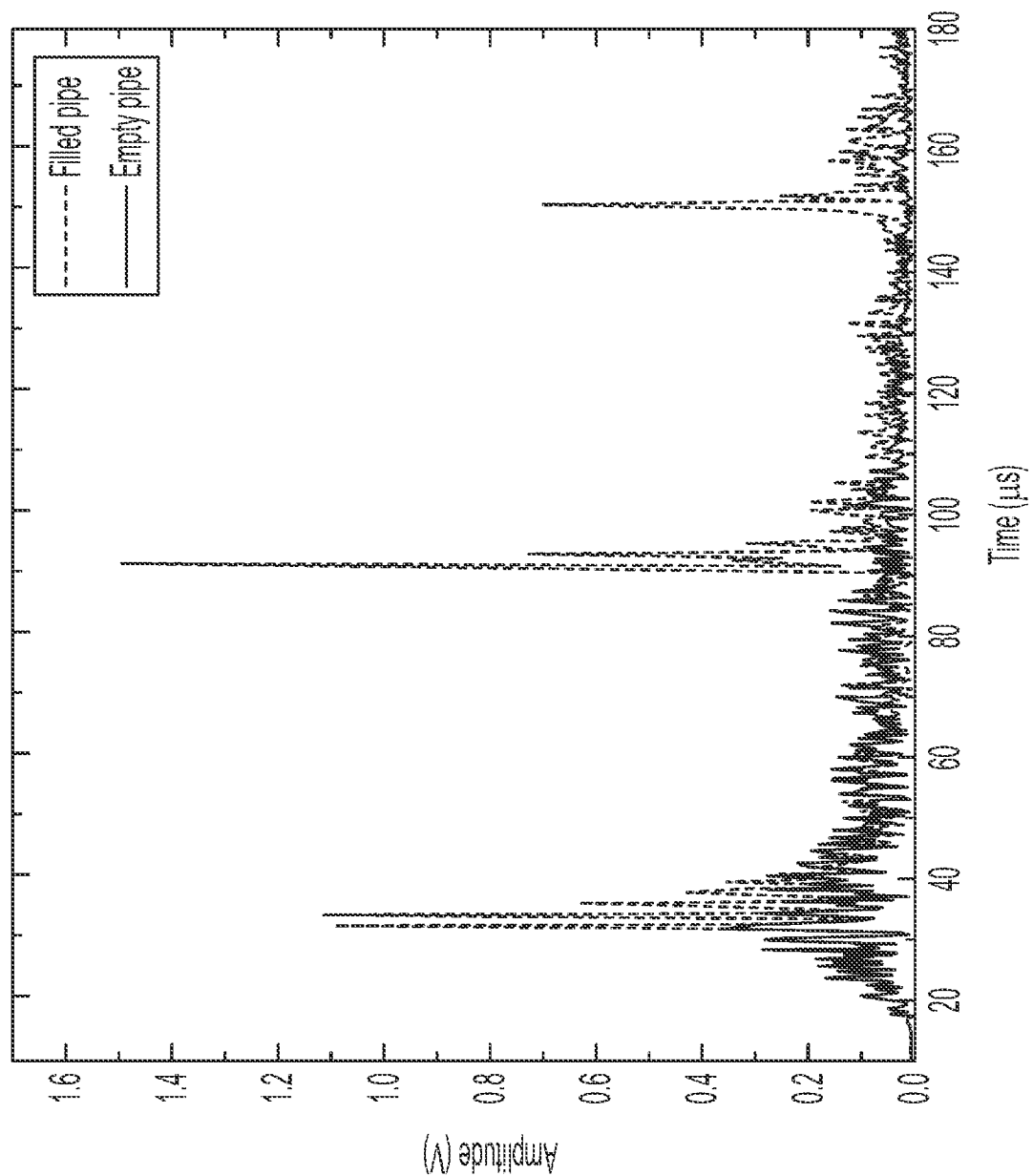
FIG. 16 is a graph of experimental data for sound transmission magnitude in a 2-in. (OD) for two situations: (1) the pipe is empty (thick solid curve); and (2) the pipe is filled with a liquid (light solid curve).

FIG. 16 shows experimental data of sound transmission magnitude on a 2-in. (OD) steel pipe, the same pipe as used throughout, for two situations: (1) the pipe is empty (thick solid curve); and (2) the pipe is filled with a liquid (light solid curve). These two curves are superimposed to show that the intensity (amplitude) of the guided waves decay quickly relative to the intensity of the detected vibrations passing through the fluid, and after approximately 50 µs, the signal level is many times smaller than the signal through the fluid. When the ratio of the intensity (amplitude) of the detected vibrations passing through the liquid to the intensity (amplitude) of the guided waves becomes sufficiently great (for example, where the signal-to-noise ratio of the detected vibrations passing through the liquid is ≥2), accurate measurement may be obtained. The first set of peaks (between 30 µs and 40 µs) are due to the sound transmission that arrives after being excited by a pulse signal of short duration. Typically, the pulses employed are shorter in duration than the time-of-flight of the signal through the fluid. For example, less than one-half the time-of-flight between the transmitting and the receiving transducers. The same result can be obtained by a frequency sweep excitation and then transforming the data to time domain through a Fast Fourier Transform (FFT). The close sharp peaks are due to multiple reflections within the thickness of the pipe wall and are 2 µs apart. This separation in time is related to the particular wall thickness of the pipe. The subsequent sets of peaks between 90 µs and 100 µs and 150 µs and 160 µs are due to multiple reflections through the full path length of the liquid inside the pipe, which is twice the pipe ID. Since the path-length is known, the TOF can be accurately determined. When the fluid flowing inside is highly attenuating (heavy crude oil) or contains a lot of gas, the transmitted signal becomes significantly less than what is shown for water in FIG. 16. In that case, the first arrival peak (between 30 µs and 40 µs) may become comparable in magnitude with the guided wave peaks shown in thicker solid lines. In such a situation, sound speed measurement becomes very difficult at best and impossible in most situations. However it may be possible to take advantage of the first reflection (peaks shown between 90 µs and 100 µs) peaks and determine the TOF with the advantage that the guided wave signal has significantly decayed by this time. It should be mentioned that the times mentioned are specific to the pipe used and the appropriate times should be considered for pipes with other dimensions. If there is sufficient signal, even the third set of peaks can be used. The first peak of the group should be considered for the TOF determination.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for noninvasively measuring acoustical properties of a fluid, said method comprising the steps of:

applying a shaped pulse signal to a first ultrasonic transducer in vibrational communication with an outside surface of a pipe having a wall and through which said fluid is flowing, the shaped pulse signal being a Gaussian modulated sine pulse, whereby vibrations are generated in said fluid and in the pipe wall;

detecting the generated vibrations on a second ultrasonic transducer disposed on the outside surface of the pipe diametrically opposite to the first ultrasonic transducer with fluid flowing through the pipe, whereby a first time-dependent electrical signal is obtained;

introducing a chosen gas into the fluid to a gas volume fraction such that no vibrations pass through the fluid;

applying the shaped pulse signal to the first ultrasonic transducer, whereby vibrations are generated solely in the pipe wall;

detecting the generated vibrations on the second ultrasonic transducer with no vibrations passing through the fluid, wherein a second time-dependent electrical signal is obtained;

subtracting the second electrical signal from the first electrical signal whereby a difference electrical signal is generated;

determining a time-of-flight of the vibrations between the first transducer and the second transducer using the difference electrical signal; and determining acoustical properties of the fluid using the determined time-of-flight of the vibrations.

2. The method of claim 1, wherein the time-of-flight of the generated vibrations between the first transducer and the second transducer is determined from the difference electrical signal using at least one of: pulse-overlap frequency mixing, signal deconvolution, or signal cross-correlation.

3. The method of claim 1, wherein a direction of propagation of the vibrations is perpendicular a direction of flow of the fluid through the pipe.

4. The method of claim 1, further comprising the step of storing the second signal as a reference signal.

5. The method of claim 1, wherein the shaped pulse signal comprises frequencies chosen to maximize the ratio of the first signal to the second signal.

* * * * *